US010331084B2

(12) United States Patent
Iri et al.

(10) Patent No.: US 10,331,084 B2
(45) Date of Patent: Jun. 25, 2019

(54) ELECTRONIC WATCH

(71) Applicant: CITIZEN WATCH CO., LTD., Tokyo (JP)

(72) Inventors: Daisuke Iri, Nishitokyo (JP); Yu Takyoh, Nishitokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 15/515,515

(22) PCT Filed: Sep. 29, 2015

(86) PCT No.: PCT/JP2015/077635
§ 371 (c)(1),
(2) Date: Mar. 29, 2017

(87) PCT Pub. No.: WO2016/052577
PCT Pub. Date: Apr. 7, 2016

(65) Prior Publication Data
US 2017/0227932 A1    Aug. 10, 2017

(30) Foreign Application Priority Data

Sep. 30, 2014  (JP) .................................. 2014-200137

(51) Int. Cl.
*G04C 3/14*    (2006.01)
*H02P 8/02*    (2006.01)

(52) U.S. Cl.
CPC ............... *G04C 3/14* (2013.01); *G04C 3/143* (2013.01); *H02P 8/02* (2013.01)

(58) Field of Classification Search
CPC .. H02P 8/02; G04C 3/14; G04C 3/143; G04C 3/146
See application file for complete search history.

(56) References Cited

U.S. PATENT DOCUMENTS 5,933,392 A    8/1999  Sato et al.
6,163,126 A   12/2000  Kojima et al.
(Continued)

FOREIGN PATENT DOCUMENTS

CN    102576215 A    7/2012
JP    S59-040186 A   3/1984
(Continued)

OTHER PUBLICATIONS

English translation of the International Search Report for PCT/JP2015/077635 dated Dec. 22, 2015.

*Primary Examiner* — Sean P Kayes
(74) *Attorney, Agent, or Firm* — HEA Law PLLC

(57) ABSTRACT

An electronic watch includes: a step motor; a driving pulse generator circuit configured to output a driving pulse for driving the step motor; a detection pulse generator circuit configured to output a detection pulse for detecting rotation of the step motor; a correction pulse generator circuit configured to output a correction pulse; a pulse selection circuit configured to select and output the driving pulse, the detection pulse, and the correction pulse; a driver circuit configured to supply to the step motor the outputs from the pulse selection circuit; and a rotation detection circuit configured to receive a detection signal generated by the detection pulse to judge rotation of the step motor. The electronic watch further includes a driving interval switch circuit configured to switch a driving interval of the driving pulse between a normal driving interval and a high-speed driving interval. The rotation detection circuit is capable of changing a detection condition by the driving interval switch circuit.

17 Claims, 21 Drawing Sheets

(56) References Cited

U.S. PATENT DOCUMENTS

| | | | |
|---|---|---|---|
| 6,843,594 B1 | 1/2005 | Moteki et al. | |
| 8,698,443 B2 * | 4/2014 | Hasegawa | G04C 3/143 318/466 |
| 8,841,875 B2 * | 9/2014 | Takyo | H02P 8/02 318/685 |
| 9,190,941 B2 * | 11/2015 | Manaka | H02P 8/38 |
| 9,612,579 B2 * | 4/2017 | Takyo | G04C 3/143 |
| 2001/0030908 A1 | 10/2001 | Moteki et al. | |
| 2008/0089183 A1 * | 4/2008 | Manaka | G04C 3/143 368/202 |
| 2009/0238044 A1 | 9/2009 | Satoh et al. | |
| 2010/0014389 A1 * | 1/2010 | Manaka | G04C 3/143 368/184 |
| 2011/0235472 A1 * | 9/2011 | Hasegawa | G04C 3/143 368/80 |
| 2012/0204640 A1 * | 8/2012 | Takyo | G04C 3/143 73/504.04 |
| 2014/0071795 A1 * | 3/2014 | Manaka | H02P 8/38 368/80 |
| 2015/0160619 A1 * | 6/2015 | Takyo | G04C 3/143 368/203 |

FOREIGN PATENT DOCUMENTS

| | | |
|---|---|---|
| JP | S60-056080 B2 | 12/1985 |
| JP | 3757421 B2 | 3/2006 |
| JP | 2013-122391 A | 6/2013 |
| JP | 2013-164374 A | 8/2013 |
| WO | 2005/119377 A1 | 4/2008 |

* cited by examiner (a)

(b)

(a) DURING NORMAL DRIVING    (b) DURING HIGH-SPEED DRIVING

DUTY CYCLE TABLE

| NORMAL DRIVING | START DUTY CYCLE DURING HIGH-SPEED DRIVING | | | |
|---|---|---|---|---|
| | COUNTER NUMBER 49 OR LESS | COUNTER NUMBER 50 OR MORE | COUNTER NUMBER 100 OR MORE | COUNTER NUMBER 256 OR MORE |
| 16/32 | 20/32 | 21/32 | 22/32 | 23/32 |
| 17/32 | 21/32 | 22/32 | 23/32 | 24/32 |
| 18/32 | 22/32 | 23/32 | 24/32 | 25/32 |
| 19/32 | 23/32 | 24/32 | 25/32 | 26/32 |
| 20/32 | 24/32 | 25/32 | 26/32 | 27/32 |
| 21/32 | 25/32 | 26/32 | 27/32 | 28/32 |
| 22/32 | 26/32 | 27/32 | 28/32 | 29/32 |
| 23/32 | 27/32 | 28/32 | 29/32 | 30/32 |
| 24/32 | 28/32 | 29/32 | 30/32 | 31/32 |
| 25/32 | 29/32 | 30/32 | 31/32 | 31/32 |
| 26/32 | 30/32 | 31/32 | 31/32 | 31/32 |
| 27/32 | 31/32 | 31/32 | 31/32 | 31/32 |
| 28/32 | 31/32 | 31/32 | 31/32 | 31/32 |
| 29/32 | 31/32 | 31/32 | 31/32 | 31/32 |
| 30/32 | 31/32 | 31/32 | 31/32 | 31/32 |
| 31/32 | 31/32 | 31/32 | 31/32 | 31/32 |

ELECTRONIC WATCH

CROSS REFERENCE TO RELATED APPLICATIONS

This application is a National Stage of International Application No. PCT/JP2015/077635 filed on Sep. 29, 2015 which claims priority from Japanese Patent Application 2014-200137, filed on Sep. 30, 2014. The contents of the above documents are incorporated herein by reference in their entirety.

TECHNICAL FIELD

The present invention relates to an electronic watch configured to drive hands thereof with a step motor, and more particularly, to an electronic watch including fast-forward means for a step motor.

BACKGROUND ART

Hitherto, an electronic watch including analog display means is generally configured to drive hands thereof with a step motor (also referred to as "stepping motor" or "pulse motor"). The step motor is formed of a stator to be magnetized by a coil and a rotor being a disc-shaped rotary body subjected to bipolar magnetization, and is generally involved in a fast-forward operation (high-speed driving) for moving the hands at high speed for time correction or the like as well as normal hand driving for moving the hands every second.

In the fast-forward operation, a driving pulse is supplied to the step motor at high speed with a short cycle period, but the step motor needs to operate without causing an error in the hand movement, that is, a rotation error of the rotor in response to the high-speed driving pulse with a short cycle period. Therefore, there has been proposed an electronic device including a step motor capable of stably conducting a fast-forward operation by detecting a rotation state of the rotor and supplying an appropriate driving pulse in accordance with the rotation state (refer to, for example, Patent Literature 1).

In Patent Literature 1, in the driving of the step motor, assuming that reverse induced power excited by rotation of the rotor is a current or a voltage, the first peak thereof is detected, and the driving pulse is supplied while presence or absence of the rotation of the rotor keeps being verified based on the detection, to thereby achieve the fast-forward operation. Further, in order to prevent an influence of spike noise ascribable to the driving pulse, there is disclosed setting an insensitive time period (mask time period) for inhibiting the reverse induced power from being detected for a predetermined time period from an output timing of the previous driving pulse, to thereby optimize a detection timing.

There has also been proposed a detection control device for a step motor, the detection control device being configured to detect a timing of damped oscillation at which a driving energy generated by a next driving pulse becomes positive from a reverse induced current generated by damped oscillation of a rotor, to thereby determine an output timing of the next driving pulse (refer to, for example, Patent Literature 2).

In Patent Literature 2, there is disclosed that, in order to detect the reverse induced current generated by the damped oscillation of the rotor and then obtain the timing at which the next driving energy becomes positive, the next driving pulse is output after a fixed delay time (d'mS). As a result, the energy of the damped oscillation of the rotor can be utilized effectively, and the current consumed by the driving can be reduced. In addition, the next driving pulse can be output without waiting for the damped oscillation of the rotor to decrease. Thus, the fast-forward operation can be conducted at higher speed than in the related art.

CITATION LIST

Patent Literature

[Patent Literature 1] JP 3757421 A (page 10, FIG. 5)
[Patent Literature 2] JP 60-056080 B (page 2, FIG. 4)

SUMMARY OF INVENTION

Technical Problem

However, the technology disclosed in Patent Literature 1 involves only one detection condition for detecting reverse induced power excited by rotation of a rotor, and is therefore unable to detect fluctuations in a detected waveform (that is, rotation fluctuations of the rotor) with high accuracy. Therefore, when the rotation of the rotor becomes unstable due to a disturbance in an external magnetic field or the like, a rotation state of the rotor cannot be grasped accurately, and hence appropriate fast-forward driving cannot be conducted, which makes it difficult to speedup a fast-forward operation. Further, in the fast-forward operation, the supply of more driving power than necessary to the step motor leads to shorter battery life of an electronic watch. However, the technology in PTL 1 cannot detect rotation with high accuracy, and hence the driving power cannot be optimized, which also raises a problem in that low-power driving is difficult.

In the technology disclosed in Patent Literature 2, a reverse induced current is detected and the next driving pulse is output after the predetermined fixed delay period (d'mS). Therefore, the technology is not capable of finely dealing with fluctuations in the rotation speed of the rotor, and hence may be susceptible to an influence by a disturbance, e.g., an external magnetic field. Further, there is always a delay time before the next driving pulse is output, and hence the fast-forward operation is limited, and there is a difficulty in achieving driving at even higher speed.

It is an object of the present invention to provide an electronic watch which solves the above-mentioned problems, and achieves stable high-speed driving of a step motor while reducing a driving power of the step motor.

Solution to Problem

In order to solve the above-mentioned problems, an electronic watch according to one embodiment of the present invention may employ the following configurations.

The electronic watch according to one embodiment of the present invention includes: a step motor; a driving pulse generator circuit configured to output a driving pulse having a plurality of different driving forces for driving the step motor; a detection pulse generator circuit configured to output, after the step motor has been driven by the driving pulse, a detection pulse for detecting rotation/non-rotation of the step motor; a correction pulse generator circuit configured to output a correction pulse for compensation of driving by the driving pulse; a pulse selection circuit configured to select and output the driving pulse, the detection pulse, and the correction pulse; a driver circuit configured to supply to the step motor the driving pulse, the detection pulse, and the correction pulse output from the pulse selection circuit; and a rotation detection circuit configured to receive a detection signal generated by the detection pulse to judge rotation/non-rotation of the step motor, the pulse selection circuit being configured to, when a judgment of non-rotation is reached by the rotation detection circuit, output the correction pulse and select a driving pulse having a higher driving force than a present driving pulse, the electronic watch further including a driving interval switch circuit configured to switch a driving interval of the driving pulse between a normal driving interval, which is a driving interval to be normally used, and a high-speed driving interval, which is a shorter driving interval than the normal driving interval, the rotation detection circuit being capable of changing a detection condition in accordance with the driving interval of the driving pulse.

Further, the driving interval switch circuit may be configured to change the detection condition of the rotation detection circuit between the normal driving interval and the high-speed driving interval.

Further, the driving interval switch circuit may be configured to change the detection condition of the rotation detection circuit such that non-rotation is judged more quickly when the high-speed driving interval is selected than when the normal driving interval is selected.

Further, the driving interval switch circuit may be configured to set a number of outputs of the detection pulse to be lower when the high-speed driving interval is selected than when the normal driving interval is selected.

Further, the rotation detection circuit may be configured to detect a detection signal generated in response to output from the driver circuit to which the step motor is connected, the rotation detection circuit may include a detection resistor connected to an output of the driver circuit, and the driving interval switch circuit may be configured to set a resistance value of the detection resistor to be lower when the high-speed driving interval is selected than when the normal driving interval is selected.

Further, the driving interval switch circuit may be configured to set an absolute value of a threshold for judging whether or not the detection signal is detectable to be higher when the high-speed driving interval is selected than when the normal driving interval is selected.

Further, the driving interval switch circuit may be configured to set a width of the detection pulse to be narrower when the high-speed driving interval is selected than when the normal driving interval is selected.

Further, the driving interval switch circuit is configured to select, when the rotation detection circuit detects the detection signal within a predetermined period from a start of output of the detection pulse but does not detect a subsequent detection signal, even though the rotation detection circuit judges that the step motor is not rotating, a driving pulse having a lower driving force than the present driving pulse as the driving pulse when the high-speed driving interval is selected.

Further, the correction pulse generator circuit may be configured to avoid outputting the correction pulse when a lower driving force than the present driving force is selected by the driving interval switch circuit as the driving pulse.

Further, the driving interval switch circuit may be configured to select, when switching from the normal driving interval to the high-speed driving interval, a higher driving force than the present driving force as the driving pulse.

Further, the electronic watch may further include a consecutive rotation counter configured to count when rotation is detected and to be reset when non-rotation is detected, and the driving interval switch circuit may be configured to determine the driving force to be used when switching from the normal driving interval to the high-speed driving interval based on a value of the consecutive rotation counter.

Further, the electronic watch may be configured to: conduct, when the driving interval switch circuit switches from the normal driving interval to the high-speed driving interval, driving of the step motor a plurality of times based on the driving pulse having a plurality of different driving forces, and conduct rotation detection by the rotation detection circuit for each of the plurality of times of driving; and select the driving force of the driving pulse based on a rotation detection result for the plurality of times of the driving of the step motor conducted based on the driving pulse having a plurality of different driving forces.

Advantageous Effects of Invention

As described above, according to the present invention, when the high-speed driving interval is selected, the detection condition of the rotation detection circuit can be changed so as to enable non-rotation to be judged more quickly than when the normal driving interval is selected. As a result, there can be provided the electronic watch configured to achieve stable high-speed driving at a low power, in which limitations on the high-speed driving imposed by a delay in rotation detection are removed and the high-speed driving of the step motor is optimized by quickly detecting a decrease in the rotation speed of the step motor and strengthening the driving force of the step motor.

DESCRIPTION OF EMBODIMENTS

Now, embodiments of the present invention are described in detail with reference to the accompanying drawings.

Features of Respective Embodiments

A first embodiment of the present invention has a feature that is a basic configuration of the present invention, in which a number of outputs of detection pulses during high-speed driving is reduced and non-rotation is quickly judged by changing a rotation detection condition between normal driving and the high-speed driving of a step motor.

A second embodiment of the present invention has a feature that non-rotation during the high-speed driving is quickly judged by switching a detection resistance value for rotation detection, or a threshold of a rotation detection circuit, during the high-speed driving of the step motor.

A third embodiment of the present invention has a feature that, when the rotation of the step motor is too fast (i.e., the driving force is too strong), the driving power is reduced by conducting control that causes the driving force of a driving pulse to decrease, to thereby optimize the driving of the step motor.

A fourth embodiment of the present invention has a feature that, when determining the start duty cycle during the high-speed driving, the start duty cycle is determined based on rotation detection results obtained by conducting hand movements having different duty cycles a plurality of times.

First Embodiment

Figure 1:
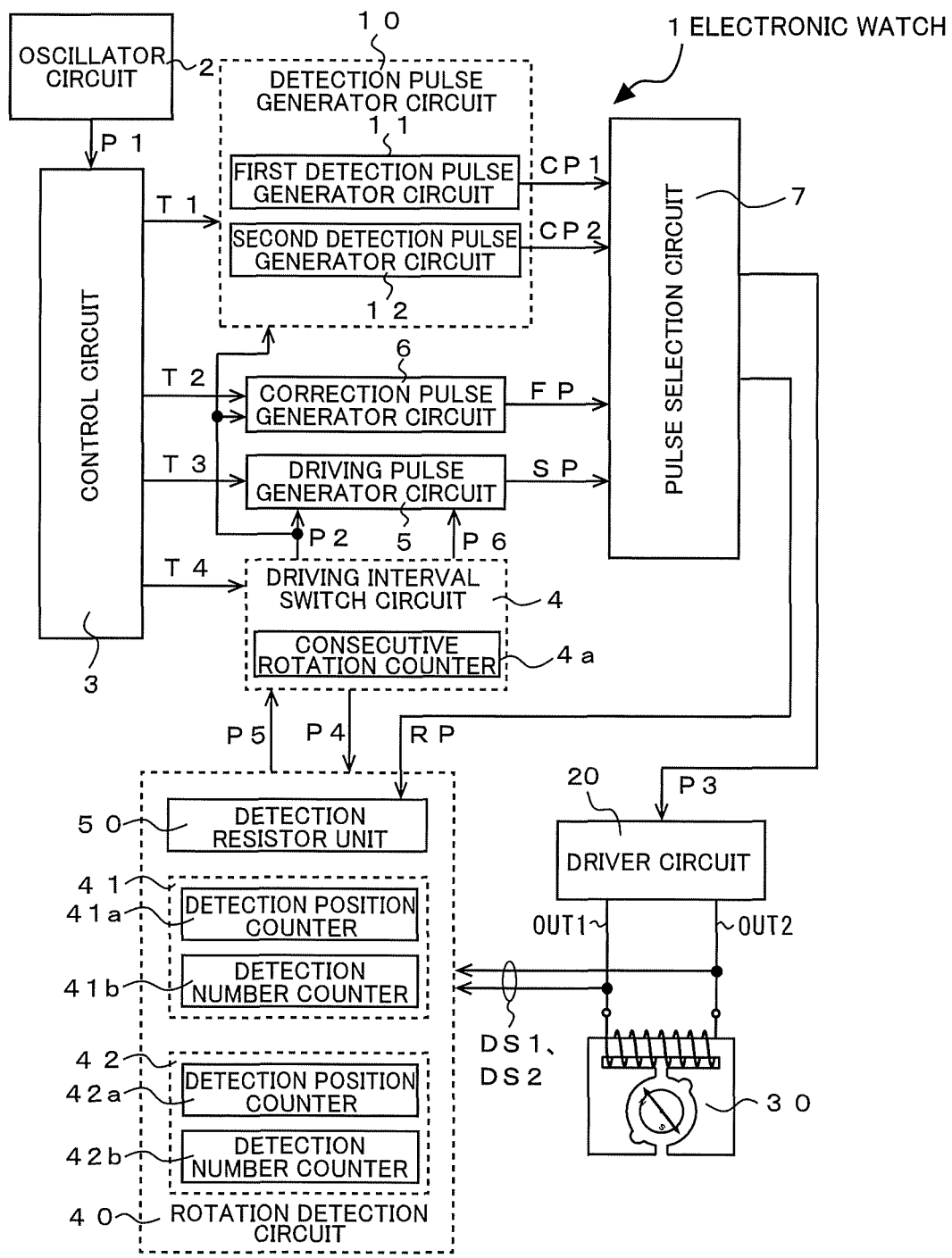
FIG. 1 is a block diagram for illustrating a schematic configuration of an electronic watch according to a first embodiment of the present invention.

<Description of Configuration of Electronic Watch According to First Embodiment: FIG. 1>

A schematic configuration of the electronic watch according to the first embodiment is described with reference to FIG. 1. In FIG. 1, reference numeral 1 represents the electronic watch according to the first embodiment. The electronic watch 1 includes an oscillator circuit 2 configured to output a predetermined reference signal P1 based on a quartz resonator (not shown), a control circuit 3 configured to receive the reference signal P1 to output timing signals T1 to T4, which are required in order to control each circuit, a driving interval switch circuit 4 configured to output a pulse generation control signal P2, a driving pulse generator circuit 5 configured to output a driving pulse SP, a correction pulse generator circuit 6 configured to output a correction pulse FP, and a detection pulse generator circuit 10 configured to output first and second detection pulses CP1 and CP2.

The electronic watch 1 further includes, for example, a pulse selection circuit 7 configured to receive the driving pulse SP and other signals to output a selection pulse P3 and a detection resistor pulse RP, a driver circuit 20 configured to receive the selection pulse P3 to output the driving pulse and other signals, a step motor 30 configured to receive the driving pulse SP and other signals to move watch hands (not shown), and a rotation detection circuit 40 configured to receive first and second detection signals DS1 and DS2 from the step motor 30 to conduct rotation detection of the step motor 30.

The electronic watch 1 is an analog display watch for displaying time with hands, and includes a battery serving as a power source, operation members, a wheel train, and hands. However, those components do not directly relate to the present invention, and hence descriptions thereof are omitted here.

The detection pulse generator circuit 10 includes a first detection pulse generator circuit 11 and a second detection pulse generator circuit 12. The detection pulse generator circuit 10 is configured to receive the timing signal T1 and the pulse generation control signal P2 for operation to output detection pulses for detecting rotation/non-rotation of the step motor 30. The first detection pulse generator circuit 11 is configured to output the first detection pulse CP1 for detecting an induced current generated on a side (reversed polarity) different from the driving pulse SP due to a counter-electromotive force generated when the step motor 30 is driven by the driving pulse SP. The second detection pulse generator circuit 12 is configured to output the second detection pulse CP2 for detecting an induced current generated on the same side (same polarity) as the driving pulse SP.

The driving interval switch circuit 4 has a function for switching between a normal driving interval of the driving pulse SP (e.g., a one-second interval) and a high-speed driving interval, which is a shorter driving interval than the normal driving interval. The driving interval switch circuit 4 is configured to receive for operation a timing signal T4, a judgment signal P5, and other signals from the rotation detection circuit 40.

The driving interval switch circuit 4 is configured to output to the rotation detection circuit 40 the pulse generation control signal P2 for controlling each pulse generator circuit, and a detection control signal P4 for changing a rotation detection condition in accordance with the normal driving interval and the high-speed driving interval. The driving interval switch circuit 4 also includes therein a consecutive rotation counter 4a configured to count a number of rotation detections. The driving interval switch circuit 4 is configured to output to the driving pulse generator circuit 5 a rank signal P6 for controlling a rank of the duty cycle of the driving pulse SP based on a count value or the like of the consecutive rotation counter 4a.

The driving pulse generator circuit 5 is configured to receive the timing signal T3, the pulse generation control signal P2, and the rank signal P6 for operation to output the driving pulse SP for driving the step motor 30. The driving pulse generator circuit 5, which is controlled by the pulse generation control signal P2 from the driving interval switch circuit 4, is configured to output the driving pulse SP of the normal driving interval every second and the driving pulse SP of the high-speed driving interval for the fast-forward operation. The driving pulse generator circuit 5 is also capable of switching the driving pulse SP to a plurality of different driving forces by controlling the duty cycle of the pulse with the rank signal P6.

The correction pulse generator circuit 6 is configured to receive the timing signal T2 and the pulse generation control signal P2 for operation to output the correction pulse FP for driving compensation when it is judged by the rotation detection circuit 40 that the step motor 30 is not rotating.

The pulse selection circuit 7 is configured to receive each of the driving pulse SP, the correction pulse FP, and the first and second detection pulses CP1 and CP2 to select and output each pulse as the selection pulse P3 to the driver circuit 20. The pulse selection circuit 7 is also configured to output a detection resistor pulse RP, which is generated from the first and second detection pulses CP1 and CP2 and is for controlling a detection resistor unit 50.

The rotation detection circuit 40 is configured to receive for operation the first and second detection signals DS1 and DS2 (generated for output to the driver circuit 20) from the step motor 30, the detection resistor pulse RP from the pulse selection circuit 7, and the detection control signal P4 from the driving interval switch circuit 4.

The rotation detection circuit 40 includes a first detection judgment circuit 41, a second detection judgment circuit 42, and the detection resistor unit 50. The first detection judgment circuit 41 includes a first detection position counter 41a configured to receive the first detection signal DS1 generated in response to the first detection pulse CP1 to examine a detection position, and a first detection number counter 41b configured to receive the first detection signal DS1 in the same manner to examine the number of times of detection.

The second detection judgment circuit 42 includes a second detection position counter 42a configured to receive the second detection signal DS2 generated in response to the second detection pulse CP2 to examine the detection position, and a second detection number counter 42b configured to receive the second detection signal DS2 in the same manner to examine the number of times of detection. The detection resistor unit 50, which is described in more detail later, is a circuit configured to connect a detection resistor to an output of the driver circuit 20 to obtain the first and second detection signals DS1 and DS2.

The rotation detection circuit 40 is configured to detect occurrence positions and a number of occurrences of the first and second detection signals DS1 and DS2 based on measurement information from the above-mentioned plurality of counters, and judge rotation/non-rotation by grasping a rotation state of the step motor 30 based on that information, to output that judgment result or the like as the judgment signal P5 to the driving interval switch circuit 4. The rotation detection circuit 40 has a function for enabling the rotation detection condition to be changed in response to the detection control signal P4 from the driving interval switch circuit 4.

The driver circuit 20, which is constructed from two driver circuits (not shown), is configured to drive the step motor 30 by converting the driving pulse SP, the correction pulse FP, and the first and second detection pulses CP1 and CP2 from each of output terminals OUT1 and OUT2 of those two driver circuits into low-impedance, and outputting the low-impedance. A detailed configuration of the driver circuit 20 is described later.

Figure 2:
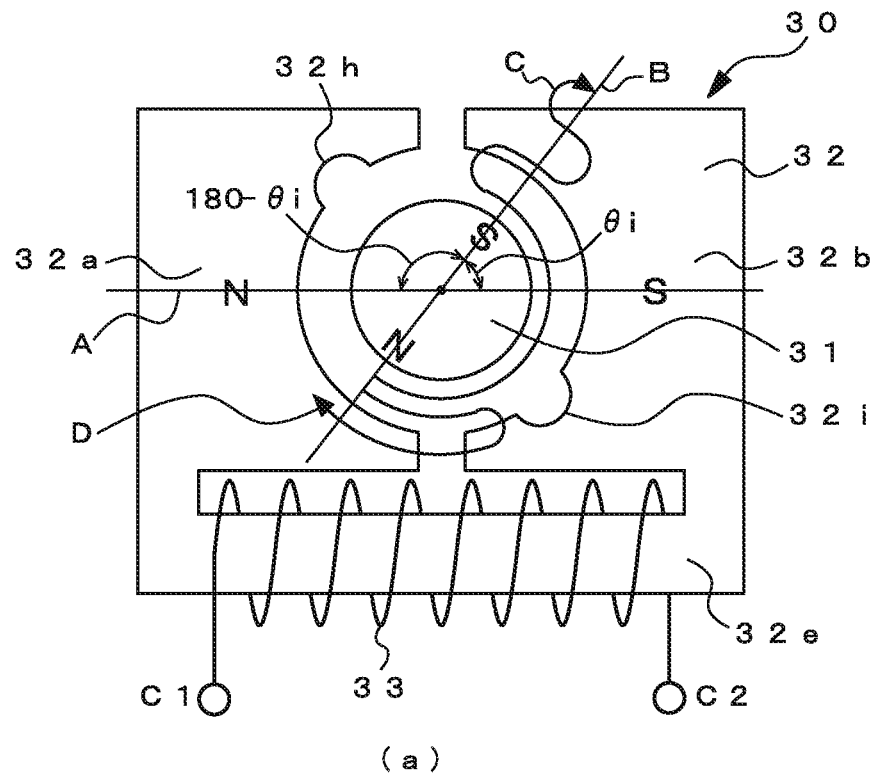
FIG. 2 are explanatory diagrams for illustrating a schematic configuration and a basic operation of a step motor according to the first embodiment of the present invention.
Figure 2:
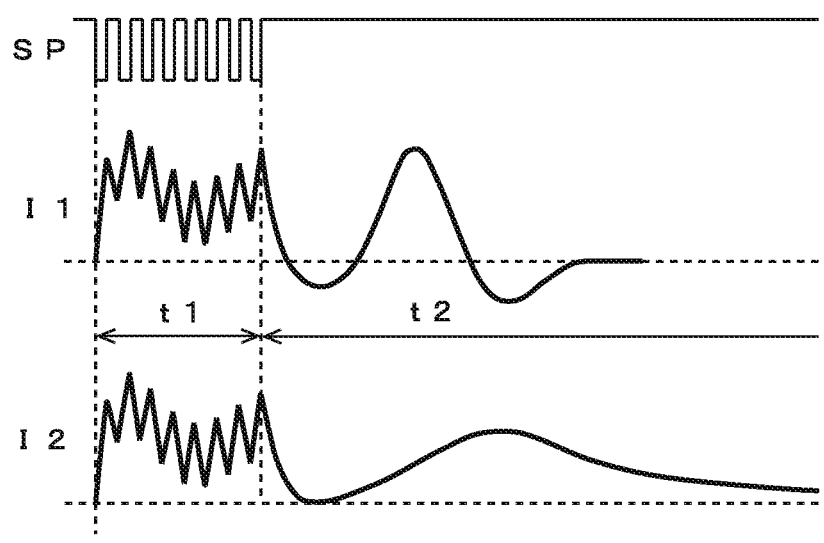

<Descriptions of Schematic Configuration and Basic Operation of Step Motor: FIGS. 2>

Next, a schematic configuration and a basic operation of the step motor 30 are described with reference to FIG. 2. In FIG. 2(a), the step motor 30 includes a rotor 31, a stator 32, and a coil 33. The rotor 31 is a disc-shaped rotary body subjected to bipolar magnetization, and is polarized to have an N-pole and an S-pole in a direction along a diameter. The stator 32 is formed of a soft magnetic material, and semicircular portions 32a and 32b surrounding the rotor 31 are separated from each other by a slit. A single-phase coil 33 is wound around a base portion 32e at which the semicircular portions 32a and 32b are coupled to each other. "Single phase" means that the number of coils is one and the number of input terminals C1 and C2 for inputting the driving pulse or the like is two.

Further, concave notches 32h and 32i are formed in predetermined positions opposed to each other on an inner peripheral surface of the semicircular portions 32a and 32b of the stator 32. The notches 32h and 32i cause a static stable point (position of a magnetic pole at a time of stop: indicated by an oblique line B) of the rotor 31 to deviate from an electromagnetic stable point (indicated by a straight line A) of the stator 32. An angular difference due to the deviation is referred to as "initial phase angle $\theta i$", and a tendency to easily rotate in a predetermined direction is imparted to the rotor 31 based on the initial phase angle $\theta i$.

Next, the basic operation of the step motor 30 is described with reference to FIG. 2 (a) and FIG. 2(b), which is a timing chart. In FIG. 2 (b), the driving pulse SP is formed of a group of a plurality of consecutive pulses as illustrated in FIG. 2(b), and the group of pulses has an adjustable pulse width (that is, duty cycle). The driving pulse SP is alternately supplied to the input terminals C1 and C2 of the step motor 30, to thereby alternately reverse magnetization of the stator 32 to cause the rotor 31 to rotate. Then, the driving interval of the rotor 31 can be controlled by making a repetition interval of the driving pulse SF adjustable, and the driving force (rotary force) of the step motor 30 can be adjusted by making the duty cycle of the driving pulse SP adjustable.

Now, in FIG. 2(a), when the driving pulse SP is supplied to the coil 33 of the step motor 30, the stator 32 is magnetized, and the rotor 31 rotates by 180 degrees (rotates counterwatchwise in FIG. 2(*a*)) from a static stable point B, but the rotor 31 does not immediately stop in that position. In actuality, the rotor 31 overruns the position at 180 degrees, oscillates with a gradually decreasing amplitude, and comes to a stop (indicated by a curved line locus C). At this time, a damped oscillation of the rotor 31 becomes a magnetic flux change with respect to the coil 33, and a counter-electromotive force due to electromagnetic induction is generated to cause an induced current to flow through the coil 33.

A current waveform I1 of FIG. 2(*b*) is an example of the induced current caused to flow through the coil 33 when the rotor 31 normally rotates by 180 degrees by the driving pulse SP. In this case, the current waveform I1 within a driven period t1 during which the driving pulse SP is being supplied exhibits a current waveform in which driving currents due to a group of a plurality of pulses and the induced current overlap each other, and the induced current due to the damped oscillation of the rotor 31 is generated during a damped period t2 after the end of the driving pulse SP.

Further, a curved line locus D of FIG. 2(*a*) indicates a locus exhibited in a case where, even when the driving pulse SP is supplied, the rotor 31 fails to rotate and returns to its original position because the step motor 30 is affected by an external magnetic field or some other factor. A current waveform I2 of FIG. 2(*b*) is an example of the induced current caused to flow through the coil 33 when the rotor 31 fails to rotate normally.

In this case, in the current waveform I2 exhibited during the damped period t2 when the rotor 31 fails to rotate, the induced current that has a smaller amplitude and a longer cycle period than the above-mentioned current waveform I1 is generated because the rotor 31 does not rotate.

In the present invention, there is provided an electronic watch, which is configured to maximize the performance of the step motor and achieve stable high-speed driving by detecting the induced current during the damped period t2 after the driving pulse SP illustrated in FIG. 2(*b*) in a plurality of divided detection segments, and quickly judging rotation/non-rotation by changing the rotation detection condition during the high-speed driving. The step motor 30 illustrated in FIG. 2(*a*) may be used in all of the first, to third embodiments, which are described later.

Figure 3:
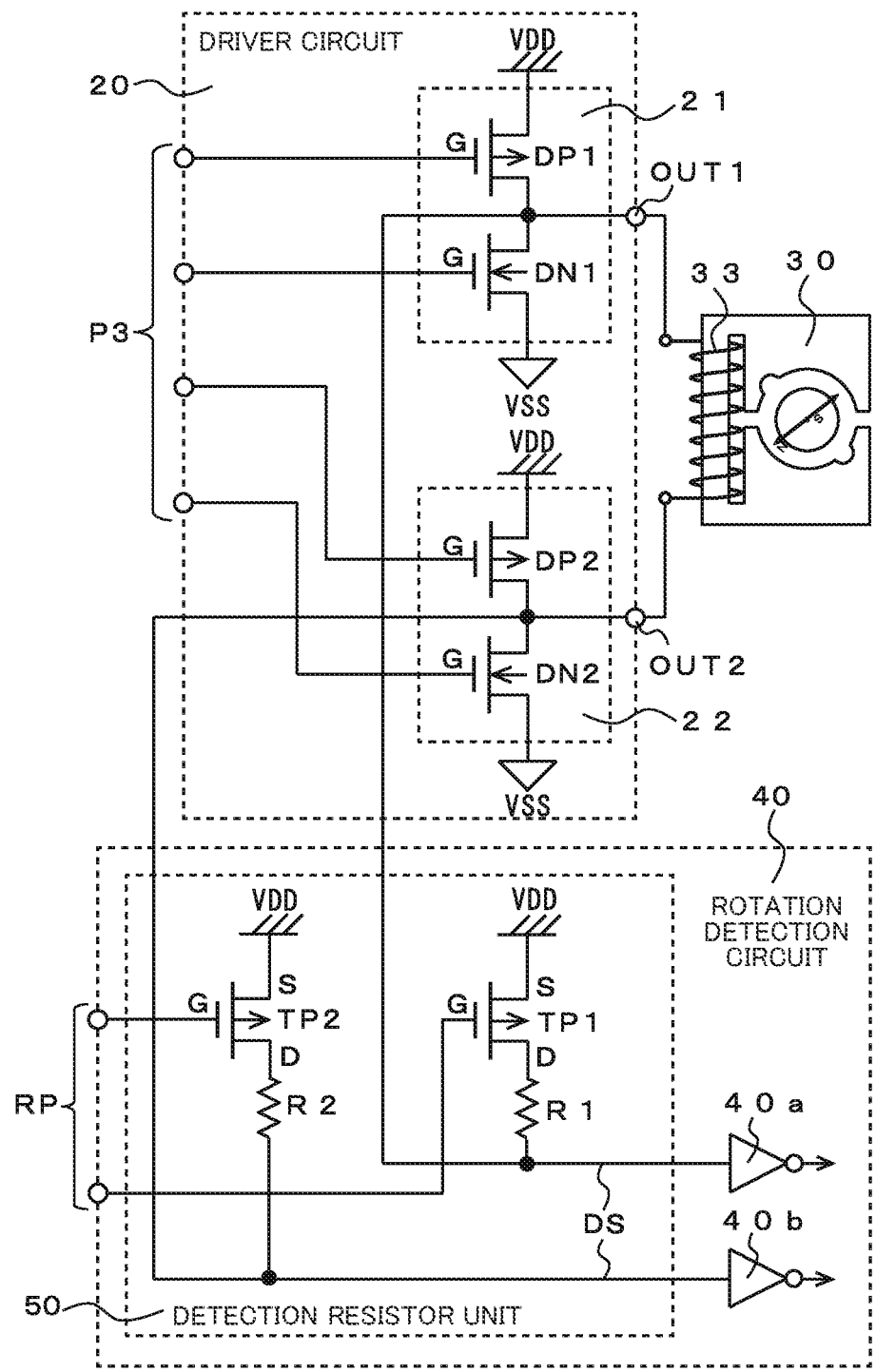
FIG. 3 is a circuit diagram for illustrating a configuration of a driver circuit and a detection resistor unit according to the first embodiment of the present invention.

<Description of Circuit Configurations of Driver Circuit and Detection Resistor Unit: FIG. 3>

Next, an example of circuit configurations of the driver circuit 20 configured to drive the step motor 30 and the detection resistor unit 50, which is a part of the rotation detection circuit configured to detect the rotation state of the step motor 30, is described with reference to FIG. 3. In FIG. 3, the driver circuit 20 is constructed from a first driver circuit 21 serving as a complementary connection between a drive transistor DP1 (hereinafter abbreviated as "transistor DP1"), which is a P-channel metal-oxide-semiconductor (MOS) transistor having a low ON resistance, and a drive transistor DN1 (hereinafter abbreviated as "transistor DN1"), which is an N-channel MOS transistor having a low ON resistance, and a second driver circuit 22 similarly serving as a complementary connection between a drive transistor DP2 (hereinafter abbreviated as "transistor DP2"), which is a P-channel MOS transistor having a low ON resistance, and a drive transistor DN2 (hereinafter abbreviated as "transistor DN2"), which is an N-channel MOS transistor having a low ON resistance.

An output OUT1 of the first driver circuit 21 is connected to one terminal of the coil 33 of the step motor 30, and an output OUT2 of the second driver circuit 22 is connected to another terminal of the coil 33 of the step motor 30. The selection pulse P3 from the pulse selection circuit 7 (refer to FIG. 1) is input to a gate terminal G of each of the transistors DP1, DN1, DP2, and DN2.

With the above-mentioned configuration, any one pulse of the driving pulse SP, the correction pulse FP, and the first and second detection pulses CP1 and CP2 selected by the pulse selection circuit 7 is input to the driver circuit 20 as the selection pulse P3, and each of the pulses for driving the step motor 30 is output alternately from the outputs OUT1 and OUT2 of the driver circuit 20.

The detection resistor unit 50 included in the rotation detection circuit 40 includes P-channel MOS transistors TP1 and TP2 (hereinafter abbreviated as "transistor TP1" and "transistor TP2", respectively). A source terminal S of each of the transistors TP1 and TP2 is connected to a power supply VDD. The detection resistor pulse RP from the pulse selection circuit 7 is input to each gate terminal G. A drain terminal D of the transistor TP1 is connected to one terminal of a detection resistor R1, and a drain terminal D of the transistor TP2 is connected to one terminal of a detection resistor R2.

Another terminal of the detection resistor R1 is connected to the output OUT1 (i.e., a drain junction of the transistor DN1 and the transistor DP1) of the first driver circuit of the driver circuit 20, and is also connected to a gate circuit 40*a* of the rotation detection circuit 40. Another terminal of the detection resistor R2 is connected to the output OUT2 (i.e., a drain junction of DN2 with the transistor DP2) of the second driver circuit of the driver circuit 20, and is also connected to a gate circuit 40*b* of the rotation detection circuit 40. It is preferred that the resistance value of the detection resistor R1 and the resistance value of the detection resistor R2 be roughly the same, and that those values be a comparatively high resistance.

The pair of signals input to the gate circuits 40*a* and 40*b* to which the detection resistors R1 and R2 are connected serve as the detection signals DS from the step motor 30. Specifically, the detection signals DS are generated at each end of the detection resistors R1 and R2 in response to the flow of the induced current from the step motor 30 to the detection resistors R1 and R2. Among the detection signals DS, which are described in detail later, a signal detected within a first detection segment is referred to as "first detection signal DS1", and a signal detected within a second detection segment is referred to as "second detection signal DS2". An illustration of the circuit configuration after the gate circuits 40*a* and 40*b* is omitted, but a count operation or the like for rotation detection is executed after the first detection judgment circuit 41 and the second detection judgment circuit 42 have been connected and the waveform of the detection signal DS has been shaped.

<Description of Basic Operation of Rotation Detection of Rotor: FIG. 1 to FIG. 4>

Figure 4:
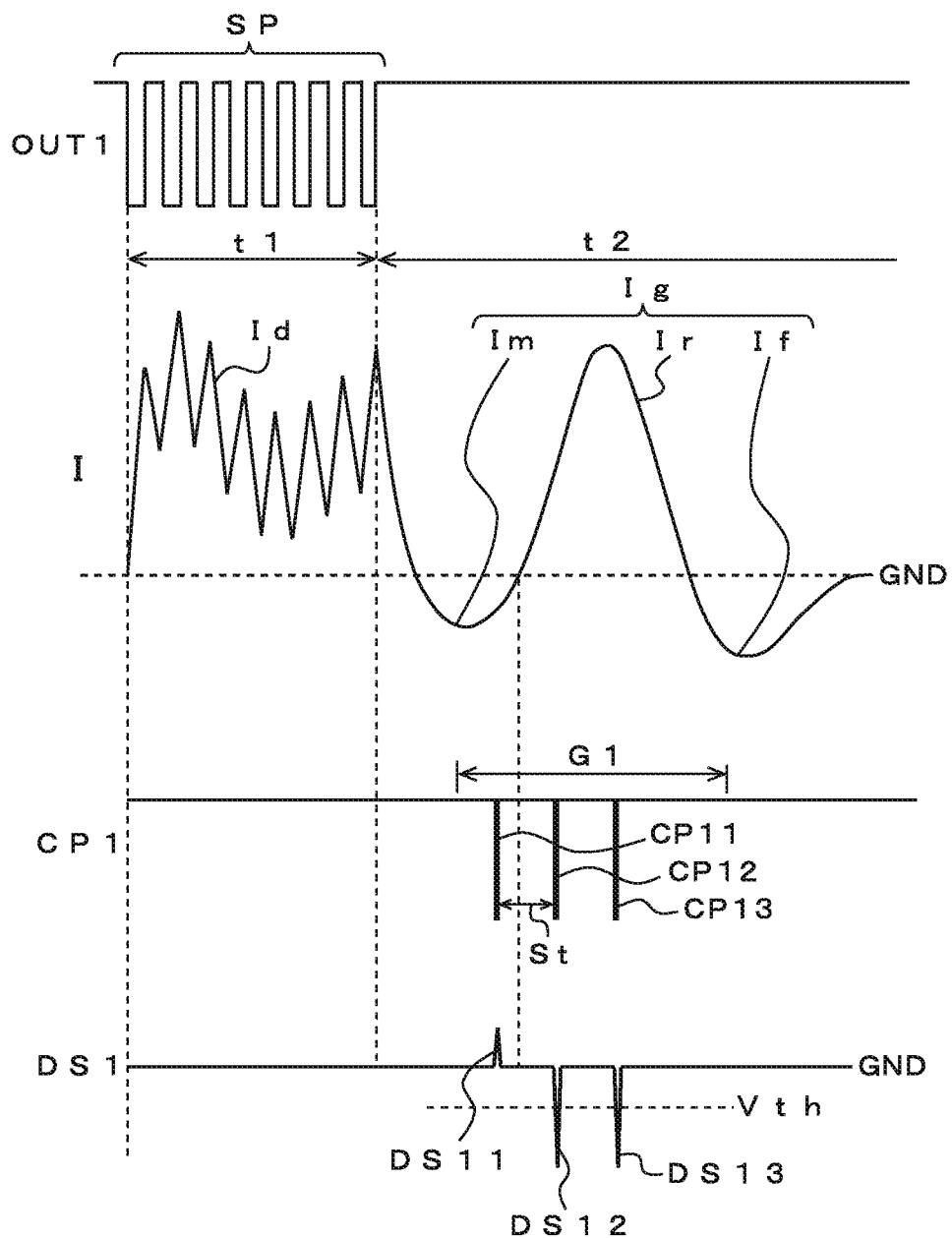
FIG. 4 is a timing chart for illustrating an induced current due to a counter-electromotive force generated from the step motor and a basic operation of rotation detection according to the first embodiment of the present invention.

Next, with reference to the timing chart of FIG. 4, a basic operation of how the rotation state of the rotor 31 is detected by the electronic watch 1 is described by taking as an example a case in which the rotor 31 has rotated normally in the above-mentioned FIG. 2 (locus C in FIG. 2(*a*)). The configuration of the electronic watch 1 is as described with reference to FIG. 1 to FIG. 3. In FIG. 4, a current waveform I flowing to the step motor 30 is indicated as a driving current Id (driven period t1) and an induced current Ig (damped period t2).

In FIG. 4, for example, when the driving pulse SP is supplied to the step motor 30 from the output OUT1, the rotor 31 rotates by 180 degrees as indicated by the locus C, and then undergoes damped oscillation (refer to FIG. 2). As described above, the driving pulse SP is formed of a group of a plurality of pulses. The driving pulse SP is repeatedly input to each gate G of the transistors DP1 and DN1 of the driver circuit 20 (refer to FIG. 3) to alternately turn ON and OFF the transistors DP1 and DN1, to thereby allow the driving current Id to flow through the coil 33 of the step motor 30 (FIG. 4: driven period t1).

Next, the induced current Ig during the damped period t2 after the driving pulse SP has ended is described in detail. After the end of the driven period t1, the induced current Ig is caused to flow on a side (positive side in terms of aground (GND)) opposite to that of the driving pulse SP due to the damped oscillation of the rotor 31. The bell-shaped area of that current is referred to as "bell" (reference symbol Ir). After the bell Ir, the induced current is caused to flow on the same side (negative side in terms of GND) as that of the driving pulse SP due to the damped oscillation of the rotor 31. The bell-like shape of that current is referred to as "well" (reference symbol If).

As illustrated in FIG. 4, immediately after the end of the driven period t1 and immediately before the bell Ir, the induced current occurs on the same side (negative side in terms of GND) as that of the driving pulse SP, and a bell-like shape of that current is referred to as "dummy well" (hereinafter abbreviated as "dummy" (symbol Im)). The dummy Im appears when the rotor 31 has not finished rotating by 180-θi degrees as illustrated in FIG. 2(a) (when the rotation of the rotor is slow) even after the driving pulse SP has ended.

Although not shown in FIG. 4, there may be a case where no dummy Im occurs, which is a case where the rotor 31 has rotated by 180-θi degrees while the driving pulse SP is being output (when the rotation of the rotor is fast).

The rotation detection through use of the first detection pulse CP1 for detecting the bell Ir is now described as an example with reference to FIG. 4. In the example illustrated in FIG. 4, the driving pulse SP is being output from the output OUT1, and hence the first detection pulse CP1 is output from the output OUT2, and three detection pulses (CP11 to CP13) are output within one detection segment. The segment in which the first detection pulse CP1 is output, namely, the segment for detecting the bell Ir, is referred to as "first detection segment G1".

When the first detection pulse CP1 is output from the first detection pulse generator circuit 11 in order to detect the bell Ir, the first detection pulse CP1 is output as the selection pulse P3 from the pulse selection circuit 7, and the detection resistor pulse RP synchronized with the first detection pulse CP1 is output. Therefore, the transistor DP1 of the driver circuit 20 is turned ON for a short period of time by the selection pulse P3, and the transistor TP2 of the detection resistor unit 50 is simultaneously turned ON for a short period of time by the detection resistor pulse RP (refer to FIG. 3). The other transistors are OFF. As a result of this operation, the output OUT1 side of the coil 33 is connected to the power supply VDD, and the output OUT2 side of the coil 33 is connected to the detection resistor R2. In other words, both ends of the coil 33 are connected to the detection resistor R2 via the power supply VDD.

As a result, the induced current Ig generated in the coil 33 is caused to flow through the detection resistor R2 for the period of the short pulse width of the first detection pulse CP1, and the first detection signal DS1 is generated at the output OUT2 as illustrated in FIG. 4. More specifically, the first detection signal DS1 is a spike signal generated at the same timing as the first detection pulse CP1.

The first detection signal DS1 is input to the gate circuit 40b connected to the detection resistor R2. Only the first detection signals DS1 exceeding a threshold Vth of the gate circuit 40b pass through the gate circuit 40b, and detection positions and number of detections are counted by the first detection judgment circuit 41 (refer to FIG. 1).

Specifically, as illustrated in FIG. 4, as an example, a first detection pulse CP11, which is the first pulse, is output in a dummy Im area of the induced current Ig, and hence a first detection signal DS11 generated by the CP11 is on the positive side from the GND. At such a timing, the DS11 does not exceed the threshold Vth of the gate circuit 40b, and hence is not detected.

The first detection pulses CP12 and CP13, which are the second and third pulses, are output in the bell Ir area of the induced current Ig, and hence DS12 and DS13 respectively generated by the CP12 and CP13 are on the negative side from the GND, and can exceed the threshold Vth of the gate circuit 40b. In other words, in the example illustrated in FIG. 4, the second and third signals of the first detection signal DS1 within the first detection segment G1 are detected, which allows the fact that the bell Ir occurred at this timing to be known. Thus, the first detection segment G1 for detecting the bell Ir is set to a period in which there is a possibility of a bell occurring.

Although not shown in FIG. 4, wells are detected through use of the second detection signal DS2, by setting a second detection segment G2 in which there is a possibility of the well If occurring, and outputting a predetermined number of the second detection pulses CP2. In the example of FIG. 4, the driving pulse SP is being output from the output OUT1, and hence the second detection pulse CP2 output within the second detection segment G2 is output from the output OUT1.

More specifically, when the second detection pulse CP2 is output from the second detection pulse generator circuit 12 in order to detect the well If, the selection pulse P3 and the detection resistor pulse RP, which are synchronized with the second detection pulse CP2, are output from the pulse selection circuit 7. Then, the transistor DP2 of the driver circuit 20 is turned ON for a short period of time by the selection pulse P3, and the transistor TP1 of the detection resistor unit 50 is simultaneously turned ON for a short period of time by the detection resistor pulse RP. The other transistors are OFF. As a result of this operation, the output OUT2 side of the coil 33 is connected to the power supply VDD, and the output OUT1 side of the coil 33 is connected to the detection resistor R1. In other words, both ends of the coil 33 are connected to the detection resistor R1 via the power supply VDD.

As a result, the induced current Ig generated in the coil 33 is caused to flow through the detection resistor R1 for the period of the short pulse width of the second detection pulse CP2, and the second detection signal DS2 is generated at the output OUT1. More specifically, the second detection signal DS2 is generated at the same timing as the second detection pulse CP2.

The second detection signal DS2 is input to the gate circuit 40a connected to the detection resistor R1. Only the second detection signals DS2 exceeding the threshold Vth of the gate circuit 40a pass through the gate circuit 40b, and the detection positions and number of detections are counted by the second detection judgment circuit 42. In FIG. 4, there is illustrated a case in which the driving pulse SP is output from the output OUT1. However, in the next driving step, the driving pulse SP is output from the output OUT2, and hence the first detection pulse CP1 within the first detection segment G1 is output to the output OUT1 side, and the second detection pulse CP2 within the second detection segment G2 is output to the output OUT1 side.

Thus, the basic rotation detection operation according to the present invention is conducted by outputting the first detection pulse CP1 and the second detection pulse CP2 in predetermined divided detection segments, and judging rotation/non-rotation of the step motor 30 by detecting the bell Ir and the well If based on the detection signals within those detection segments. The high-speed driving of the step motor is optimized by selecting the driving interval of the driving pulse SP and the pulse duty cycle in accordance with that judgment result.

Figure 5:
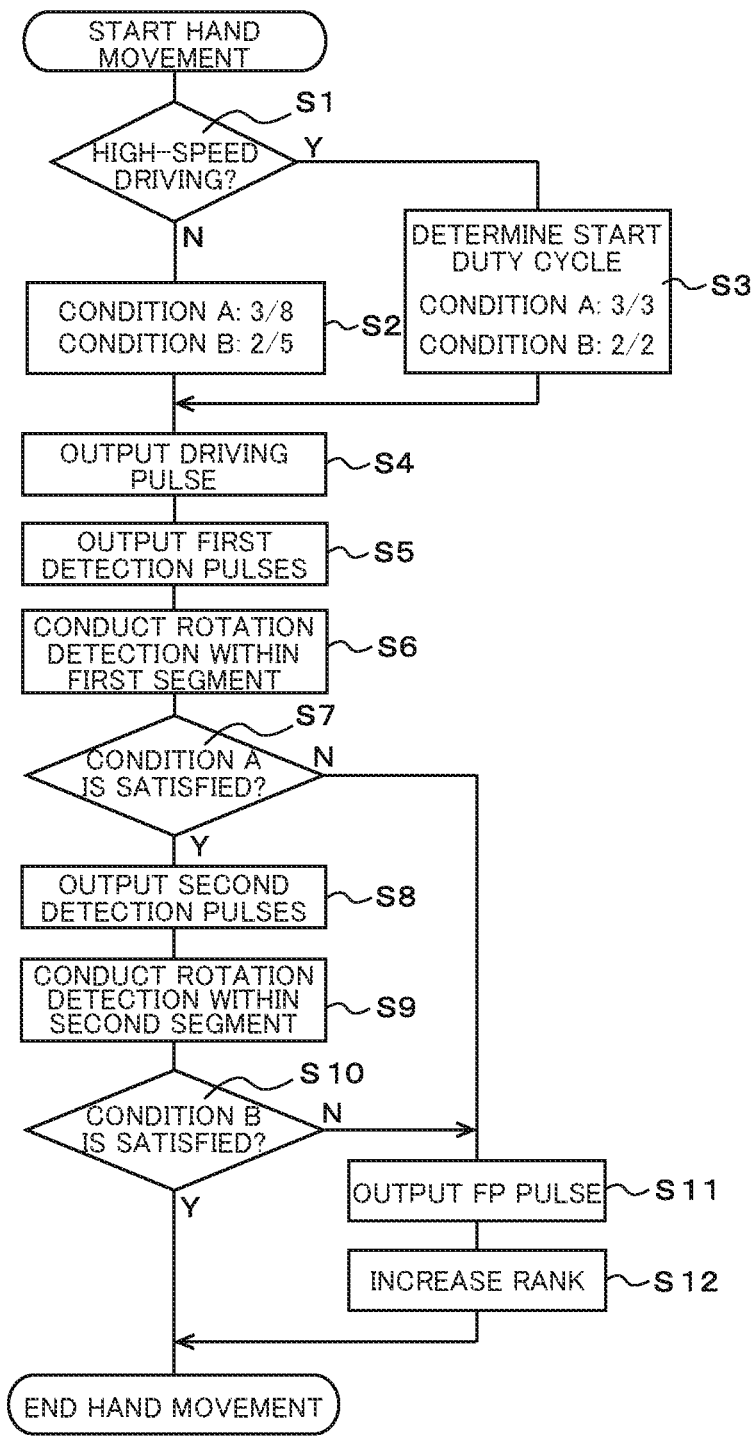
FIG. 5 is a flowchart for illustrating a rotation detection operation and driving of the step motor for the electronic watch according to the first embodiment of the present invention.
Figure 6:
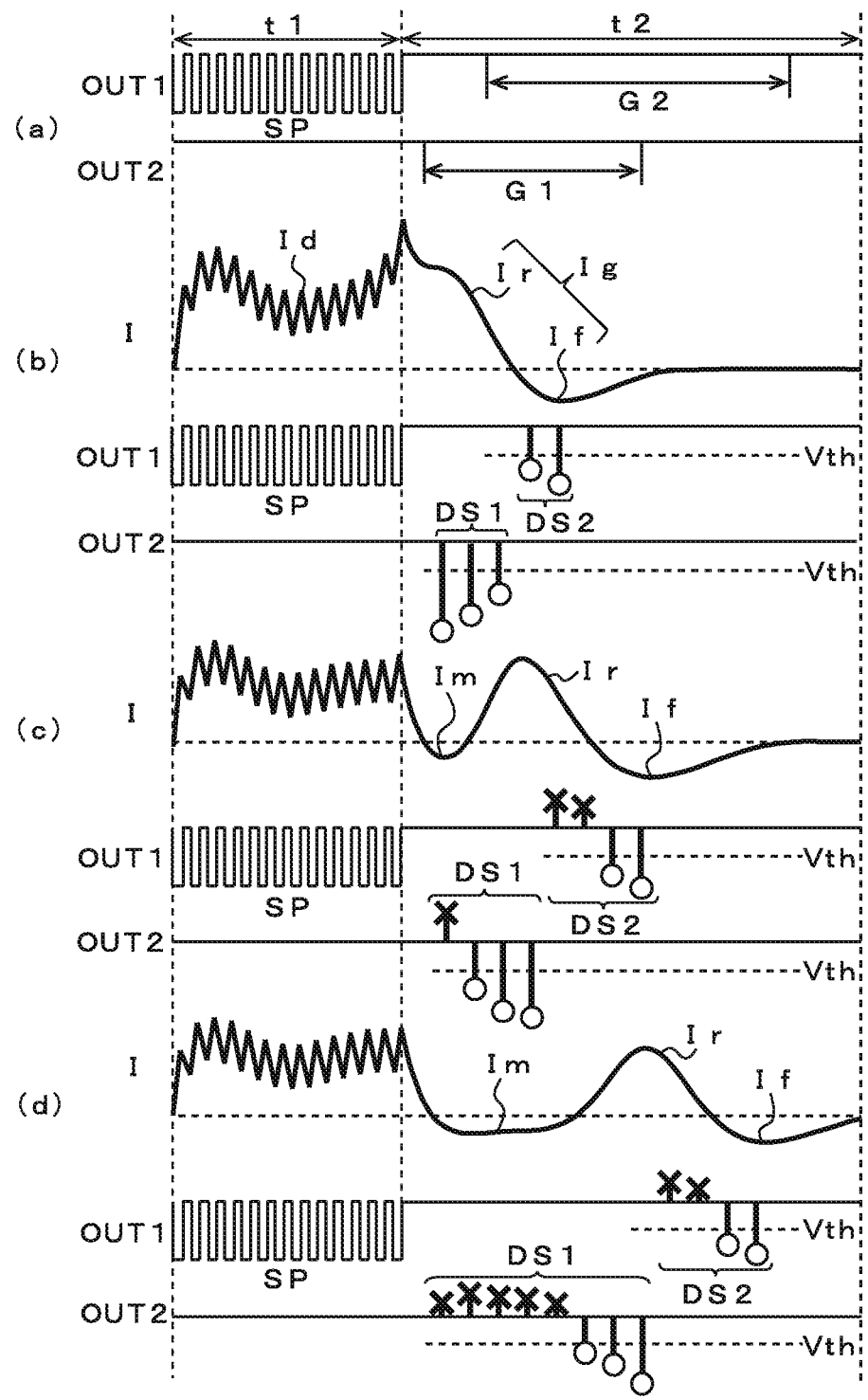
FIG. 6 are timing charts for illustrating the rotation detection operation during normal driving of the electronic watch according to the first embodiment of the present invention.

<Description of Rotation Detection During Normal Driving Interval According to First Embodiment: FIG. 5 and FIGS. 6>

Next, the rotation detection operation conducted during the normal driving interval according to the first embodiment is described with reference to the flowchart of FIG. 5 and the timing charts of FIG. 6. In the timing charts of FIG. 6, there are schematically illustrated examples of the current waveform I, the driving pulse SP, and the first and second detection signals DS1 and DS2. As described above, the current waveform I is divided into the driving current Id and the induced current Ig. The configuration of the electronic watch 1 is as described with reference to FIG. 1 to FIG. 3.

First, a rotation detection operation flow during the normal driving is described. In FIG. 5, a condition A represents a rotation detection condition within the first detection segment G1, and a condition B represents a rotation detection condition within the second detection segment G2. In FIG. 5, when the electronic watch 1 is operating at the normal driving interval (e.g., a one-second hand movement operation), in Step S1, the driving is judged to not be the high-speed driving, and the processing proceeds to Step S2.

In Step S2, the condition "Condition A: ⅜" means three signals out of eight pulses. More specifically, when three first detection signals DS1 are detected out of eight outputs of the first detection pulse CP1 within the first detection segment G1 for detecting the bell Ir, based on the condition A for the normal driving, it is judged that the bell Ir has been detected normally.

The condition "Condition B: ⅖" means two signals out of five pulses. More specifically, when two second detection signals DS2 are detected out of five outputs of the second detection pulse CP2 within the second detection segment G2 for detecting the well If, based on the condition B for the normal driving, it is judged that the well If has been detected normally and that the rotor 31 has rotated normally.

Next, the electronic watch 1 outputs the driving pulse SP from the driving pulse generator circuit 5, and outputs the driving pulse SP from the output OUT1 of the driver circuit 20 via the pulse selection circuit 7 (Step S4). In FIG. 6(a), there is illustrated the fact that the driving pulse SP based on a predetermined duty cycle has been output from the output OUT1. This driving pulse SP is formed of a plurality of consecutive pulses based on a predetermined duty cycle for the driven period t1.

Next, the driving interval switch circuit 4 of the electronic watch 1 instructs the detection pulse generator circuit 10 to output eight first detection pulses CP1 based on the condition A for the normal driving during the damped period t2 after the end of the driven period t1 (Step S5).

Next, the rotation detection circuit 40 of the electronic watch 1 detects the first detection signals DS1 generated by the first detection pulses CP1 (detection operation within first detection segment G1: Step S6).

Next, the rotation detection circuit 40 counts the first detection signals DS1 that exceed the predetermined threshold Vth with an internal counter, and conducts the judgment based on the condition A (Step S7). In this example, when three or more first detection signals DS1 are counted, the condition A is satisfied (i.e., an affirmative judgment is reached), and the processing proceeds to Step S8, which is a second detection operation to be conducted next.

When three or more first detection signals DS1 are not counted, this means that the condition A is not satisfied (i.e., a negative judgment is reached). Therefore, the rotation detection circuit judges that the rotor 31 is not rotating, and outputs the correction pulse FP for driving compensation (Step S11). In order to increase the driving force of the driving pulse SP, the rotation detection circuit 40 also increases the rank of the duty cycle of the driving pulse SP (Step S12), then finishes the driving, and waits until the next driving. The reason for increasing the rank of the duty cycle of the driving pulse SP is that it may be considered that the condition A is not satisfied because the driving force of the step motor 30 is weak.

When an affirmative judgment is reached in Step S7, the driving interval switch circuit 4 instructs the detection pulse generator circuit 10 to output five second detection pulses CP2 based on the condition B for the normal driving (Step S8).

Next, the rotation detection circuit 40 detects the second detection signals DS2 generated by the second detection pulses CP2 (detection operation within second detection segment G2: Step S9).

Next, the rotation detection circuit 40 counts the second detection signals DS2 that exceed the predetermined threshold Vth with an internal counter, and conducts the judgment based on the condition B (Step S10). In this example, when two or more second detection signals DS2 are counted, the condition B is satisfied (i.e., an affirmative judgment is reached), and hence the rotor 31 is judged to have rotated normally during the normal driving. As a result, the rotation detection circuit 40 finishes the driving, and waits until the next driving.

When two or more second detection signals DS2 are not counted, this means that the condition B is not satisfied (i.e., a negative judgment is reached). Therefore, the rotation detection circuit judges that the rotor 31 is not rotating, and outputs the correction pulse FP (Step S11). In order to increase the driving force of the driving pulse SP, the rotation detection circuit also increases the rank of the duty cycle of the driving pulse SP (Step S12), then finishes the driving, and waits until the next driving.

Next, an example of the rotation detection operation during the normal driving based on the flowchart illustrated in FIG. 5 is described with reference to the timing charts of FIG. 6. In FIG. 6(a), there are illustrated the driving pulse SP to be output from the output OUT1 during the driven period t1, and the first detection segment G1 and the second detection segment G2 during the damped period t2. Specifically, the first detection segment G1 is a segment for detecting the bell Ir of the induced current Ig, and within which the first detection pulses CP1 are output to the output OUT2. The second detection segment G2 is a segment for detecting the well If of the induced current Ig, and within which the second detection pulses CP2 are output to the output OUT1. In this example, the first detection segment G1 and the second detection segment G2 temporally overlap because the second detection segment G2 starts immediately after the condition A is satisfied during the first detection segment G1.

In FIG. 6(b), FIG. 6(c), and FIG. 6(d), there are illustrated examples of how the first detection signals DS1 and the second detection signals DS2 are detected based on a difference in the speed of rotation of the rotor 31 of the step motor 30 during the normal driving. In FIG. 6(b), there is illustrated an example in which the rotor 31 has rotated quickly. This example illustrates that because the rotation of the rotor 31 is fast, there is no occurrence of an induced current Ig dummy (refer to FIG. 4), and a large bell Ir occurs immediately after the end of the driven period t1.

In this case, within the first detection segment G1, when the first detection pulses CP1 are output from the output OUT2, because a large bell Ir has already occurred, three first detection signals DS1 from the head thereof generated by the first detection pulses CP1 exceed the threshold Vth (the first to third DS1 signals are indicated by "o"). Therefore, the judgment conducted in Step S7 based on the condition A for the normal driving is affirmative, and the rotation detection operation immediately proceeds to the second detection segment G2.

When the rotation detection operation proceeds to the second detection segment G2, at this timing, the well If occurs soon in the induced current Ig. Therefore, when the second detection pulses CP2 are output to the output OUT1, two second detection signals DS2 from the head thereof generated by the second detection pulses CP2 exceed the threshold Vth (the first and second DS2 signals are indicated by "o"). As a result, the judgment conducted in Step S10 based on the condition B for the normal driving is affirmative, and the step motor 30 is judged to have rotated normally. Thus, in FIG. 6(b), because the rotation of the rotor 31 is fast, among the examples illustrated in FIG. 6, rotation detection is established the earliest.

In FIG. 6(c), there is illustrated an example in which the rotation of the rotor 31 is relatively slow. In this example, a short-duration dummy Im occurs in the induced current Ig. In this case, within the first detection segment G1, when the first detection pulses CP1 are output from the output OUT2, the first signal at the head of the first detection signals DS1 is not detected because that signal is generated at a reversed polarity due to the dummy. Three signals after the dummy, namely, the second to fourth signals of the first detection signals DS1 (the first DS1 signal is indicated by "x" and the second to fourth DS1 signals are indicated by "o") exceed the threshold Vth due to the bell Ir occurring relatively late. Therefore, the judgment conducted in Step S7 based on the condition A is affirmative, and the rotation detection operation proceeds to the second detection segment G2 at a relatively late timing.

When the rotation detection operation proceeds to the second detection segment G2, at this timing, a bell Ir is still occurring in the induced current Ig. Therefore, when the second detection pulses CP2 are output, the signals from the head until the second signal of the second detection signals DS2 are not detected. At the timing of the occurrence of the well If, the third and fourth signals of the second detection signals DS2 exceed the threshold Vth (the first and second DS2 signals are indicated by "x", and the third and fourth DS2 signals are indicated by "o"). As a result, the judgment conducted in Step S10 based on the condition B is affirmative, and the step motor 30 is judged to have rotated normally at a timing later than that in FIG. 6 (b). Thus, in FIG. 6(c), because the rotation of the rotor 31 is relatively slow, rotation detection is established relatively late.

In FIG. 6(d), there is illustrated an example in which the rotation of the rotor 31 is slow due to the influence of an external magnetic field or the like. In this example, because the rotation of the rotor 31 is slow, a long-duration dummy Im occurs in the induced current Ig. In this case, when the first detection pulses CP1 are output from the output OUT2 within the first detection segment G1, the first to fifth signals of the first detection signals DS1 are not detected as a result of the dummy. The three signals after the dummy, namely, the sixth to eighth signals of the first detection signals DS1 (the first to fifth DS1 signals are indicated by "x" and the sixth to eighth DS1 signals are indicated by "0") exceed the threshold Vth due to the bell Ir occurring quite late. Therefore, the judgment conducted in Step S7 based on the condition A is affirmative, and the rotation detection operation proceeds to the second detection segment G2 at a quite late timing.

When the rotation detection operation proceeds to the second detection segment G2, at this timing, a bell is still occurring in the induced current Ig. Therefore, when the second detection pulses CP2 are output, the signals from the head until the second signal of the second detection signals DS2 are not detected. At the timing of the occurrence of the well If, the third and fourth signals of the second detection signals DS2 exceed the threshold Vth (the first and second DS2 signals are indicated by "i", and the third and fourth DS2 signals are indicated by "o"). As a result, the judgment conducted in Step S10 based on the condition B is affirmative, and the step motor 30 is judged to have rotated normally at a timing later than that in FIG. 6 (c). Thus, in FIG. 6(d), because the rotation of the rotor 31 is slow, rotation detection is established the latest.

Thus, rotation detection for the normal driving is conducted by detecting the induced current Ig separately in the first detection segment G1 and the second detection segment G2, and setting many detection pulses within each detection segment, to thereby enable rotation of the rotor 31 to be correctly detected even when the speed of rotation of the rotor 31 fluctuates greatly due to the influence of a disturbance or the like. The rotor 31 may be judged to have rotated normally even when the rotation of the rotor 31 is slow, and hence the step motor 30 can continue low-power driving.

However, although not a problem for normal driving such as one-second hand movements, when high-speed driving, e.g., a fast-forward hand movement, is necessary, there is a problem in that the step motor 30 cannot be driven at high speed due to the fact that rotation detection is established at a late timing.

For example, when the rotation of the rotor 31 is quite slow, as illustrated in FIG. 6(d), the establishment of the rotation detection is late even when the rotor 31 is judged as having rotated at a detection timing that is just in time, and hence the timing for outputting the next driving pulse SP is delayed. As a result, the high-speed driving is subject to limitations imposed by the delay in rotation detection. The present invention is directed to solving such a problem, and achieves high-speed driving that maximizes the high-speed rotation performance of the step motor 30 by changing the rotation detection condition when the electronic watch has selected the high-speed driving so as to enable non-rotation to be detected more quickly.

Figure 7:
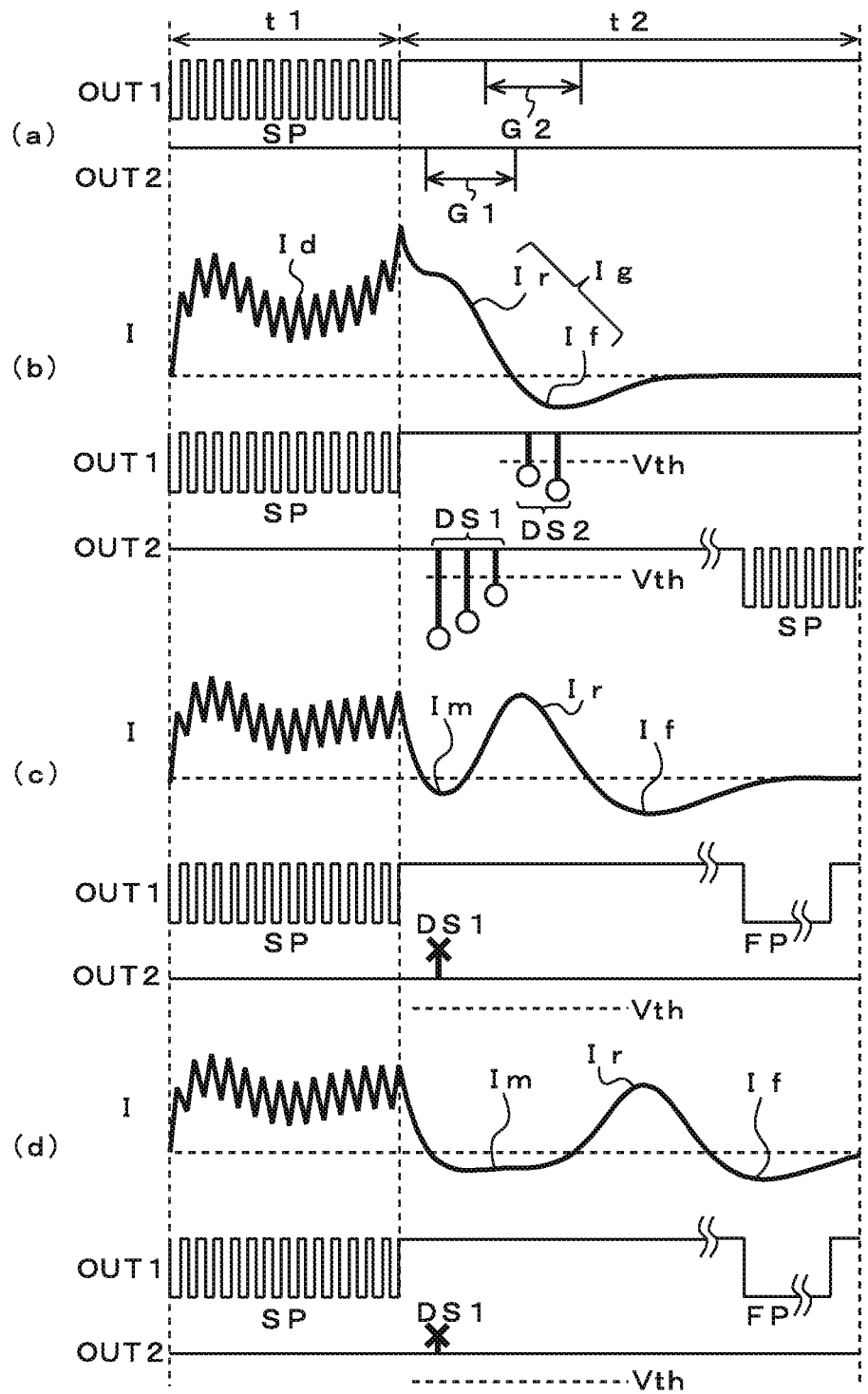
FIG. 7 are timing charts for illustrating the rotation detection operation during high-speed driving of the electronic watch according to the first embodiment of the present invention.

<Description of Rotation Detection During High-Speed Driving Interval According to First Embodiment: FIG. 5 and FIGS. 7>

Next, the rotation detection operation during the high-speed driving interval according to the first embodiment, which is a feature of the present invention, is described with reference to the flowchart of FIG. 5 and the timing charts of FIG. 7. In the timing charts of FIG. 7, similarly to the above-mentioned FIG. 6, there are schematically illustrated the current waveform I, the driving pulse SP, the first and second detection signals DS1 and DS2, and the correction pulse FP.

In FIG. 5, when the electronic watch 1 is conducting the high-speed driving interval (fast-forward operation), the judgment in Step S1 is affirmative, and the processing proceeds to Step S3. In Step S3, the initial duty cycle (start duty cycle) of the driving pulse SP when the rotation detection operation has proceeded to the high-speed driving is determined. The determination of the start duty cycle is conducted by referring to the duty cycle of the driving pulse SP during the normal driving before proceeding to the high-speed driving. The determination method is described in more detail later.

Next, also in Step S3, as the condition A of the rotation detection during the high-speed driving, the detection condition of the first detection segment G1 is set to three signals out of three pulses. In other words, in the condition A for the high-speed driving, the number of outputs of the first detection pulse CP1 is decreased to three, and hence, the bell Ir is judged as having been detected normally when three detection signals DS1 are detected from three outputs of the first detection pulse CP1.

As the condition B, the detection condition of the second detection segment G2 is set to two signals out of two pulses. In other words, in the condition B for the high-speed driving, the number of outputs of the second detection pulse CP2 is decreased to two, and hence the well If is detected normally, and the rotor 31 is judged to have rotated normally when two detection signals DS2 are detected from two outputs of the second detection pulse CP2.

Next, in Step S4, the same operation as that for the normal driving is conducted, and hence a description thereof is omitted here.

Next, the driving interval switch circuit 4 of the electronic watch 1 instructs the detection pulse generator circuit 10 to output three first detection pulses CP1 based on the condition A for the normal driving during the damped period t2 after the end of the driven period t1 (Step S5).

Next, the rotation detection circuit 40 of the electronic watch 1 detects the first detection signals DS1 generated by the first detection pulses CP1 (detection operation within first detection segment G1: Step S6).

Next, the rotation detection circuit 40 counts the first detection signals DS1 that exceed the predetermined threshold Vth with an internal counter, and conducts the judgment based on the condition A for the high-speed driving (Step S7). In this example, when three first detection signals DS1 out of three pulses are counted, the condition A is satisfied (i.e., an affirmative judgment is reached), and the processing proceeds to Step S8, which is a second detection operation to be conducted next.

When three first detection signals DS1 are not counted, this means that the condition A is not satisfied (i.e., a negative judgment is reached). Therefore, the rotation detection circuit judges that the rotor 31 is not rotating, and outputs the correction pulse FP for driving compensation (Step S11). In order to increase the driving force of the driving pulse SP, the rotation detection circuit 40 also increases the rank of the duty cycle of the driving pulse SP (Step S12), then finishes the driving, and waits until the next driving.

When an affirmative judgment is reached in Step 7, the driving interval switch circuit 4 instructs the detection pulse generator circuit 10 to output two second detection pulses CP2 based on the condition B for the high-speed driving (Step S8).

Next, the rotation detection circuit 40 detects the second detection signals DS2 generated by the second detection pulses CP2 (detection operation within second detection segment G2: Step S9).

Next, the rotation detection circuit 40 counts the second detection signals DS2 that exceed the predetermined threshold Vth with an internal counter, and conducts the judgment based on the condition B (Step S10). In this example, when two second detection signals DS2 are counted, the condition B is satisfied (i.e., an affirmative judgment is reached), and hence the rotor 31 is judged to have rotated normally during the high-speed driving. As a result, the rotation detection circuit 40 finishes the driving, and waits until the next driving.

When two second detection signals DS2 are not counted, this means that the condition B is not satisfied (i.e., a negative judgment is reached). Therefore, the rotation detection circuit judges that the rotor 31 is not rotating, and outputs the correction pulse FP (Step S11). In order to increase the driving force of the driving pulse SP, the rotation detection circuit also increases the rank of the duty cycle of the driving pulse SP (Step S12), then finishes the driving, and waits until the next driving.

Next, an example of the rotation detection operation during the high-speed driving based on the flowchart illustrated in FIG. 5 is described with reference to the timing charts of FIG. 7. FIG. 7 (a) is the same as the above-mentioned FIG. 6(a), and hence a description thereof is omitted here. In this example, the number of times each of the detection pulses CP is output (i.e., the sampling number) within the first detection segment G1 and the second detection segment G2 for the high-speed driving is less than that for the normal driving, and hence the intervals are shorter.

In FIG. 7 (b), FIG. 7 (c), and FIG. 7 (d), there are illustrated examples of how the first detection signals DS1 and the second detection signals DS2 are detected based on a difference in the speed of rotation of the rotor 31 of the step motor 30 during the high-speed driving. In FIG. 7(b), there is illustrated an example in which the rotor 31 has rotated quickly. This example illustrates that because the rotation of the rotor 31 is fast, there is no occurrence of an induced current Ig dummy (refer to FIG. 4), and a large bell Ir occurs immediately after the end of the driven period t1.

In this case, within the first detection segment G1, when three first detection pulses CP1 are output to the output OUT2, because a large bell Ir has already occurred, three first detection signals DS1 from the head thereof exceed the threshold Vth (the three signals from the first DS1 signal are indicated by "o"). Therefore, the judgment conducted in Step S7 based on the condition A for the high-speed driving is affirmative, and the rotation detection operation immediately proceeds to the second detection segment G2.

When the rotation detection operation proceeds to the second detection segment G2, at this timing, the well If occurs soon in the induced current Ig. Therefore, when the second detection pulses CP2 are output to the output OUT1, two second detection signals DS2 from the head thereof exceed the threshold Vth (the first and second DS2 signals are indicated by "o"). As a result, the judgment conducted in Step S10 based on the condition B for the high-speed driving is affirmative, and the step motor 30 is judged to have rotated normally. Thus, in FIG. 7(b), because the rotation of the rotor 31 is fast, rotation detection is established normally.

In FIG. 7(b), the step motor 30 is judged to have rotated normally, and hence after a predetermined period of time, for example, after 6 mS, the next driving pulse SP is output from the output OUT2. Thus, when it is judged that the rotor 31 has rotated normally, the high-speed driving of the step motor 30 may be achieved by alternately outputting the driving pulse SP from the output OUT1 and the output OUT2 at a short interval. Specifically, in the high-speed driving illustrated in FIG. 7(b), the rotation speed of the rotor 31 is fast, and also the damped oscillation is short. Therefore, rotation detection may be established quickly, and stable high-speed driving that maximizes the performance of the step motor 30 can be achieved.

In FIG. 7(c), there is illustrated an example in which the rotation of the rotor 31 is relatively slow. In this example, a short-duration dummy Im occurs in the induced current Ig. In this case, within the first detection segment G1, when the first detection pulses CP1 are output from the output OUT2, the first signal at the head of the first detection signals DS1 is not detected because that signal is generated at a reversed polarity due to the dummy (the first DS1 signal is indicated by "x").

The condition A for the high-speed driving requires that all three signals out of three first detection pulses CP1 be detected, and hence when the first signal at the head is not detected, then the judgment of the condition A in Step S7 is negative (i.e., a judgment of non-rotation is reached). As a result, the processing immediately proceeds to Step S11, and the correction pulse FP for driving compensation is output from the output OUT1. Based on the output of the correction pulse FP, the rotor 31 having slow rotation can be caused to reliably rotate.

Next, after the output of the correction pulse FP, processing for increasing the rank of the duty cycle of the driving pulse SP to strengthen the driving force of the driving pulse SP to be output next is executed (Step S12). The driving force of the next driving pulse SP is strengthened by the increase in the rank, and hence the rotation of the rotor 31 becomes faster.

As a result, the waveform of the induced current Ig in FIG. 7(c) becomes more like the waveform of the induced current Ig illustrated in FIG. 7(b) due to the next driving pulse SP. Therefore, the condition A detection (Step S7) and the condition B detection (Step S10) are both judged to be affirmative, and control is conducted such that the high-speed driving is continued. More specifically, even when the rotation of the rotor 31 is slow, non-rotation is quickly detected, the correction pulse FP is output, and the rank is increased, and hence the electronic watch 1 becomes more optimized to the operation suited to the high-speed driving illustrated in FIG. 7(b).

In FIG. 7 (d), there is illustrated an example in which the rotation of the rotor 31 is quite slow due to influence of an external magnetic field or the like. In this example, because the rotation of the rotor 31 is slow, a long-duration dummy Im occurs in the induced current Ig. Also in this case, within the first detection segment G1, when the first detection pulses CP1 are output from the output OUT2, the first signal at the head of the first detection signals DS1 is not detected due to the dummy (the first DS1 signal is indicated by "x").

As described above, the condition A for the high-speed driving requires that all three signals out of three first detection pulses CP1 be detected, and hence the judgment of the condition A in Step S7 is negative (i.e., a judgment of non-rotation is reached). As a result, the processing immediately proceeds to Steps S11 and S12 and, similarly to the case in FIG. 7(c), the correction pulse FP is output and the rank is increased. The driving force of the next driving pulse SP is strengthened by the processing of increasing the rank, and hence the rotation of the rotor 31 becomes faster.

As a result, the waveform of the induced current Ig in FIG. 7(d) becomes more like the waveform of the induced current Ig illustrated in FIG. 7(b) due to the next driving pulse SP. Therefore, the condition A detection (Step S7) and the condition B detection (Step S10) are both judged to be affirmative, and control is conducted such that the high-speed driving is continued. More specifically, even when the rotation of the rotor 31 is quite slow, non-rotation is quickly detected, the correction pulse FP is output, and the rank is increased, and hence the electronic watch 1 becomes more optimized to the operation suited to the high-speed driving illustrated in FIG. 7(b).

Even when the rotation detection operation does not approach the high-speed driving operation illustrated in FIG. 7 (b) when the processing for outputting the correction pulse FP and increasing the rank is conducted once, by repeating the rotation detection operation after the output of the driving pulse SP, the rotation speed of the rotor 31 is increased in a short period of time, and the rotation detection operation becomes optimized to the high-speed driving operation of FIG. 7(b). In the high-speed driving operation illustrated in FIG. 7(b), the correction pulse FP, which causes the driving power to increase, is not output, and the rank of the driving pulse SP is not increased. Therefore, high-speed driving at lower power can be stably continued.

Although not shown in FIG. 7, during the high-speed driving, when an affirmative judgment is reached regarding the detection of the condition A within the first detection segment G1 (Step S7), and a negative judgment is reached regarding the detection of the condition B within the second detection segment G2 (Step S10) conducted thereafter, the processing immediately proceeds to Steps S11 and S12 from the timing of the second detection segment G2, the correction pulse FP is output, and the rank is increased.

Thus, in this embodiment, when driving the step motor 30 at high speed, the rotation detection condition is set to be stricter than during the normal driving, to thereby enable a decrease in the rotation speed of the rotor 31 to be judged more quickly as being non-rotation.

As described in Step S3 of FIG. 5 in this embodiment, the change in the rotation detection condition decreases the number of outputs of the detection pulses within the first detection segment G1 and the second detection segment G2. Specifically, in the case of the high-speed driving, as described above as an example, the number of detection pulses within the first detection segment G1 is decreased from eight to three, and the number of detection pulses within the second detection segment G2 is decreased from five to two.

Thus, when the electronic watch 1 has selected the high-speed driving, non-rotation can be judged based on whether or not the detection signals from each of the head detection pulses of the first and second detection segments G1 and G2 have been detected. As a result, there may be provided an electronic watch, which is configured to achieve stable high-speed driving at low power by quickly judging that a decrease in the rotation speed of the rotor 31 is non-rotation, and immediately strengthening the driving force of the step motor to optimize the step motor.

In the high-speed driving, for example, control may be conducted for shortening the period of the detection pulses in addition to decreasing the number of outputs of the detection pulses. Specifically, when a period St (refer to FIG. 4) of the detection pulses for the normal driving is 0.5 mS, the period is shortened to 0.25 mS for the high-speed driving. This enables the judgment of rotation/non-rotation to be reached even more quickly. The start position of each detection pulse may also be arbitrarily changed in accordance with the waveform of the induced current Ig.

Regarding the correction pulse FP output for driving compensation, when the step motor 30 is judged to not be rotating based on rotation detection during the normal driving (FIG. 5: negative judgment in Step S1, and negative judgment in Step S7 or S10), because there is a high likelihood that the step motor 30 is indeed not rotating (FIG. 2: refer to locus D), it is necessary to cause the rotor 31 to reliably rotate by supplying a correction pulse FP having a larger driving force than the driving pulse SP.

However, when a judgment of non-rotation is reached based on rotation detection during the high-speed driving (FIG. 5: affirmative judgment in Step S1, and negative judgment in Step S7 or S10), because the decrease in the rotation speed of the rotor 31 is quickly judged as being non-rotation, there is a high likelihood that the rotor 31 is actually rotating, that is, that the rotation speed of the rotor 31 is just slow. As a result, the correction pulse FP when a judgment of non-rotation has been reached during the high-speed driving may be a driving force that is approximately the same as, or less than, the driving pulse SP. Therefore, the correction pulse FP may be formed such that pulses having different driving force specifications can be output during the normal driving and during the high-speed driving.

Thus, by weakening the driving force of the correction pulse FP during the high-speed driving, the driving power during the high-speed driving can be reduced. Further, by supplying a correction pulse FP having an appropriate driving force to the step motor 30, the high-speed rotation of the rotor 31 can be smoother, and hence the high-speed driving can be even faster. The specification of the correction pulse FP during the high-speed driving is the same in the second and third embodiments, which are described later.

Figure 8:
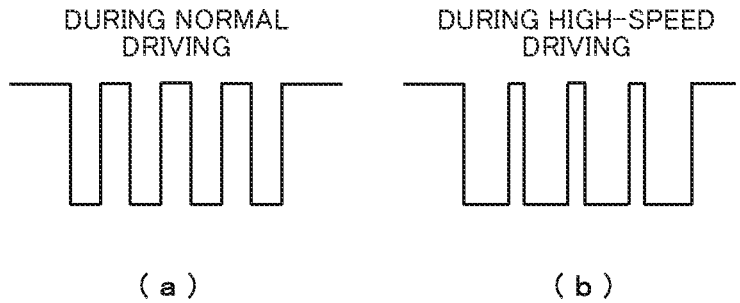
FIG. 8 are a pair of explanatory diagrams and a table for showing a determination of a start duty cycle of a driving pulse when proceeding to the high-speed driving from the normal driving of the electronic watch according to the first embodiment of the present invention.

<Description of Determination Method of Duty Cycle of Driving Pulse SP: FIGS. 8>

Next, the determination of the start duty cycle of the driving pulse SP when the electronic watch 1 proceeds from the normal driving (e.g., one-second hand movements) to the high-speed driving (Step S3 of the flowchart illustrated in FIG. 5) is described with reference to FIG. 8.

Selection of the duty cycle of the driving pulse SP for the normal driving, e.g., one-secondhand movements, is influenced by, for example, the performance of the step motor 30 and disturbances. However, in FIG. 8, a comparatively low duty cycle is selected (refer to FIG. 8(a)). On the other hand, for the high-speed driving, because it is necessary to cause the rotor 31 to rotate in a short period of time, it is preferred that the duty cycle of the driving pulse SP be set higher than that for the normal driving (refer to FIG. 8(b)).

When the electronic watch 1 proceeds from the normal driving to the high-speed driving, the start duty cycle of the driving pulse SP may be determined with reference to the duty cycle of the driving pulse SP during the normal driving. The table ("Duty Table") shown in FIG. 8 is an example of a table for determining the start duty cycle when proceeding from the normal driving to the high-speed driving. The vertical axis of the table shows an area of the duty cycle of the driving pulse SP for the normal driving. For example, the value 16/32 indicates that the duty cycle for the normal driving is 50%. The value 31/32 is the maximum duty cycle for the normal driving.

A counter count represents a count value of the consecutive rotation counter 4a, which is included in the above-mentioned driving interval switch circuit 4. The consecutive rotation counter 4a is configured to count each time normal rotation is judged by the rotation detection circuit 40, and to be reset when non-rotation is judged. Therefore, when the counter count is low, this indicates that the rotation of the step motor 30 is unstable (there have been many detections of non-rotation), and when the counter number is high, this indicates that the rotation is stable (there have been few detections of non-rotation).

The fact that the rotation of the step motor 30 is unstable indicates that the rank has been frequently increased to strengthen the driving force of the driving pulse SP. Therefore, when proceeding from such a state to the high-speed driving, it is judged that there is little need for further strengthening the driving force, and the increase in the rank of the start duty cycle is set to be low. For example, in the table shown in FIG. 8, when the normal state duty cycle is 18/32 (cell enclosed by the thick line), for a counter count of 49 or less, it may be presumed that the rotation is unstable, and hence the duty cycle is set to 22/32, which is close to 18/32.

The fact that the rotation of the step motor 30 is stable indicates that the driving force of the driving pulse SP is a weak and low-power driving force. Therefore, when proceeding from the low-power driving state to the high-speed driving, the driving force is considered to be insufficient, and hence the rank of the start duty cycle is set to be higher. For example, in the table shown in FIG. 8, when the normal state duty cycle is 18/32, for a counter count of 256 or more, it may be presumed that the rotation is stable, and hence a comparatively high duty cycle of 25/32 is set.

On the other hand, the duty cycle when returning from the high-speed driving to the normal driving may also be determined by referring to this table. For example, when the duty cycle of the driving pulse SP for the normal driving is 18/32, and the counter count is 256 or more, the start duty cycle is 25/32 when proceeding from the normal driving to the high-speed driving.

There is now considered a case in which, during the high-speed driving, non-rotation is detected based on the above-mentioned flowchart (refer to FIG. 5), the rank is increased, and the high-speed driving is continued at, for example, 30/32. In this case, when subsequently returning to the normal driving, the duty cycle may be returned to 18/32, which is the initial duty cycle for the normal driving in the table, or the duty cycle may be set from the present position of 30/32 of the high-speed driving in the table to the normal driving duty cycle of 23/32, which is obtained by shifting upward and to the left in the table.

Thus, the switching operation between the normal driving and the high-speed driving may be conducted smoothly by referring to the rank of the driving pulse SP during the normal driving and the counter count of the consecutive rotation counter 4a to create the table, and determining the start duty cycle of the high-speed driving and the duty cycle when returning to the normal driving. The start duty cycle of the high-speed driving may also be determined in the same manner as in the second and third embodiments, which are described later.

Thus, in the first embodiment of the present invention, the number of outputs of the detection pulses to be used as a rotation detection condition during the high-speed driving is decreased so as to enable rotation/non-rotation of the step motor to be judged more quickly than during the normal driving. As a result, there may be provided an electronic watch configured to achieve stable high-speed driving at low power, in which limitations on the high-speed driving imposed by a delay in rotation detection of the step motor are removed, and the high-speed driving of the step motor is optimized.

Second Embodiment

Figure 9:
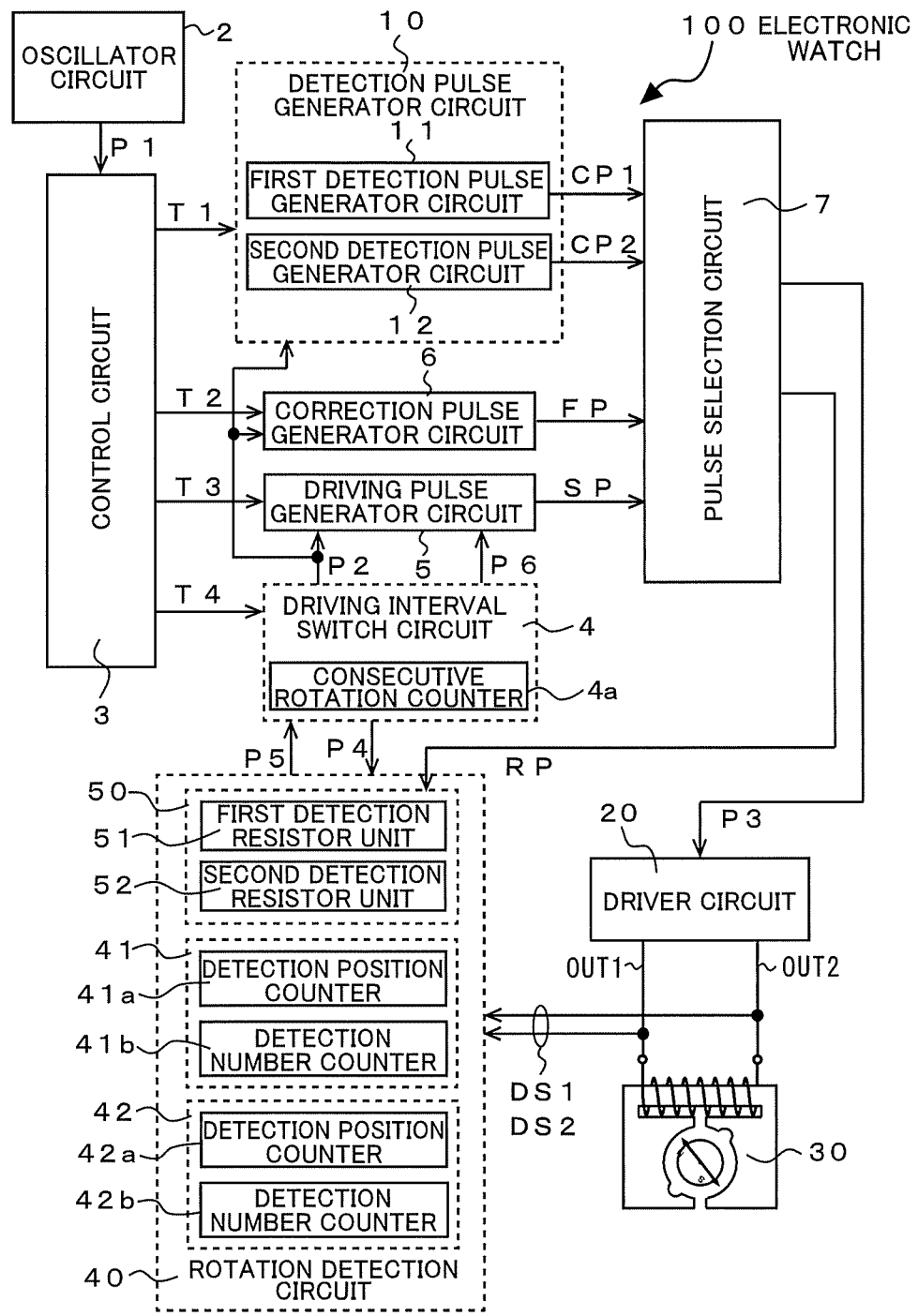
FIG. 9 is a block diagram for illustrating a schematic configuration of an electronic watch according to a second embodiment of the present invention.

<Description of Configuration of Electronic Watch According to Second Embodiment: FIG. 9>

A schematic configuration of an electronic watch according to the second embodiment is described with reference to FIG. 9. The basic configuration of the second embodiment is the same as that of the first embodiment, and hence like parts are denoted with like reference numerals. In the second embodiment, the description is focused on the detection resistor unit 50 included in the rotation detection circuit 40, which is a feature of the second embodiment.

In FIG. 9, reference number 100 denotes the electronic watch according to the second embodiment. The electronic watch 100 includes similar structural parts to those in the first embodiment, but the configuration of the detection resistor unit 50 included in the rotation detection circuit 40 is different. Specifically, the detection resistor unit 50 includes two detection resistor units, namely, a first detection resistor unit 51 and a second detection resistor unit 52.

Figure 10:
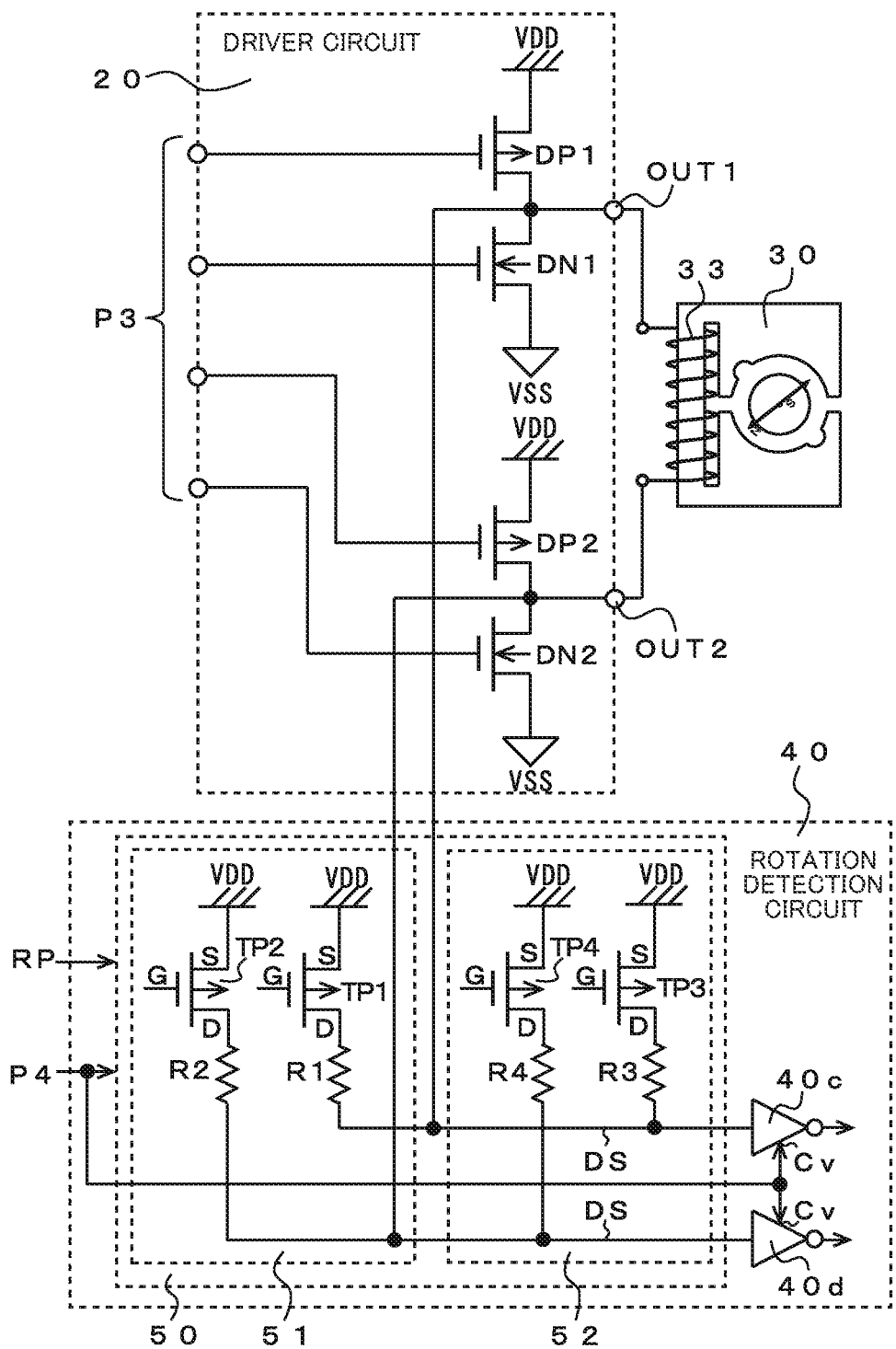
FIG. 10 is a circuit diagram for illustrating a configuration of a driver circuit and a detection resistor unit according to the second embodiment of the present invention.

The detection resistor unit 50, which is described in more detail later with reference to FIG. 10, is controlled by the detection control signal P4 from the driving interval switch circuit 4 and the detection resistor pulse RP from the pulse selection circuit 7. The detection resistor unit 50 is configured to operate by switching between the first detection resistor unit 51 and the second detection resistor unit 52 during the normal driving and the high-speed driving.

<Description of Circuit Configurations of Driver Circuit and Detection Resistor Unit According to Second Embodiment: FIG. 10>

Next, the circuit configurations of the driver circuit 20 and the detection resistor unit 50, which is a part of the rotation detection circuit 40, according to the second embodiment are described with reference to FIG. 10. The circuit configuration of the driver circuit 20 is the same as that in the first embodiment. Therefore, a description thereof is omitted here, and the description is focused on the circuit configuration of the detection resistor unit 50, which is a feature of this embodiment.

In FIG. 10, the detection resistor unit 50, which is a part of the rotation detection circuit 40, is constructed from the first detection resistor unit 51 and the second detection resistor unit 52. Similarly to the first embodiment, the first detection resistor unit 51 includes the transistors TP1 and TP2. The source terminal S of each of the transistors TP1 and TP2 is connected to the power supply VDD. The drain terminal D of the transistor TP1 is connected to one terminal of the detection resistor R1, and the drain terminal D of the transistor TP2 is connected to one terminal of the detection resistor R2. A control signal (not shown) generated by the detection resistor pulse RP from the pulse selection circuit 7 and the detection control signal P4 from the driving interval switch circuit 4 is input to each gate terminal G.

Another terminal of the detection resistor R1 is connected to the output OUT1 (i.e., a drain junction of DN1 with the transistor DP1) of the driver circuit 20, and is also input to a gate circuit 40c of the rotation detection circuit 40. Another terminal of the detection resistor R2 is connected to the output OUT2 (i.e., a drain junction of DN2 with the transistor DP2) of the driver circuit 20, and is also input to a gate circuit 40d of the rotation detection circuit 40.

The second detection resistor unit 52 has the same configuration as the first detection resistor unit 51. In other words, the second detection resistor unit 52 includes P-channel MOS transistors TP3 and TP4 (hereinafter abbreviated as "transistor TP3" and "transistor TP4", respectively). The source terminal S of each of the transistors TP3 and TP4 is connected to the power supply VDD. The drain terminal D of the transistor TP3 is connected to one terminal of a detection resistor R3, and the drain terminal D of the transistor TP4 is connected to one terminal of a detection resistor R4. A control signal (not shown) generated by the detection resistor pulse RP and the detection control signal P4 is input to each gate terminal G.

Another terminal of the detection resistor R3 is connected to the output OUT1 of the driver circuit 20, and is also input to the gate circuit 40c of the rotation detection circuit 40. Another terminal of the detection resistor R4 is connected to the output OUT2 of the driver circuit 20, and is also input to the gate circuit 40d of the rotation detection circuit 40.

A relation between resistance values of the detection resistors R1 and R2 of the first detection resistor unit 51 and resistance values of the detection resistors R3 and R4 of the second detection resistor unit 52 is set such that (R1=R2)>(R3=R4).

The signals input to the gate circuit 40c and the gate circuit 40d to which each detection resistor is connected are the detection signals DS (specifically, similarly to the first embodiment, the first detection signal DS1 and the second detection signal DS2) from the step motor 30. In other words, the detection signals DS are generated across both ends of each detection resistor by causing the induced current Ig from the step motor 30 to flow through each detection resistor. The circuit configuration after the gate circuits 40c and 40d is the same as that in the first embodiment. A control terminal Cv of each of the gate circuits 40c and 40d is a part added to Modified Example 1 of the second embodiment to be described later.

Figure 11:
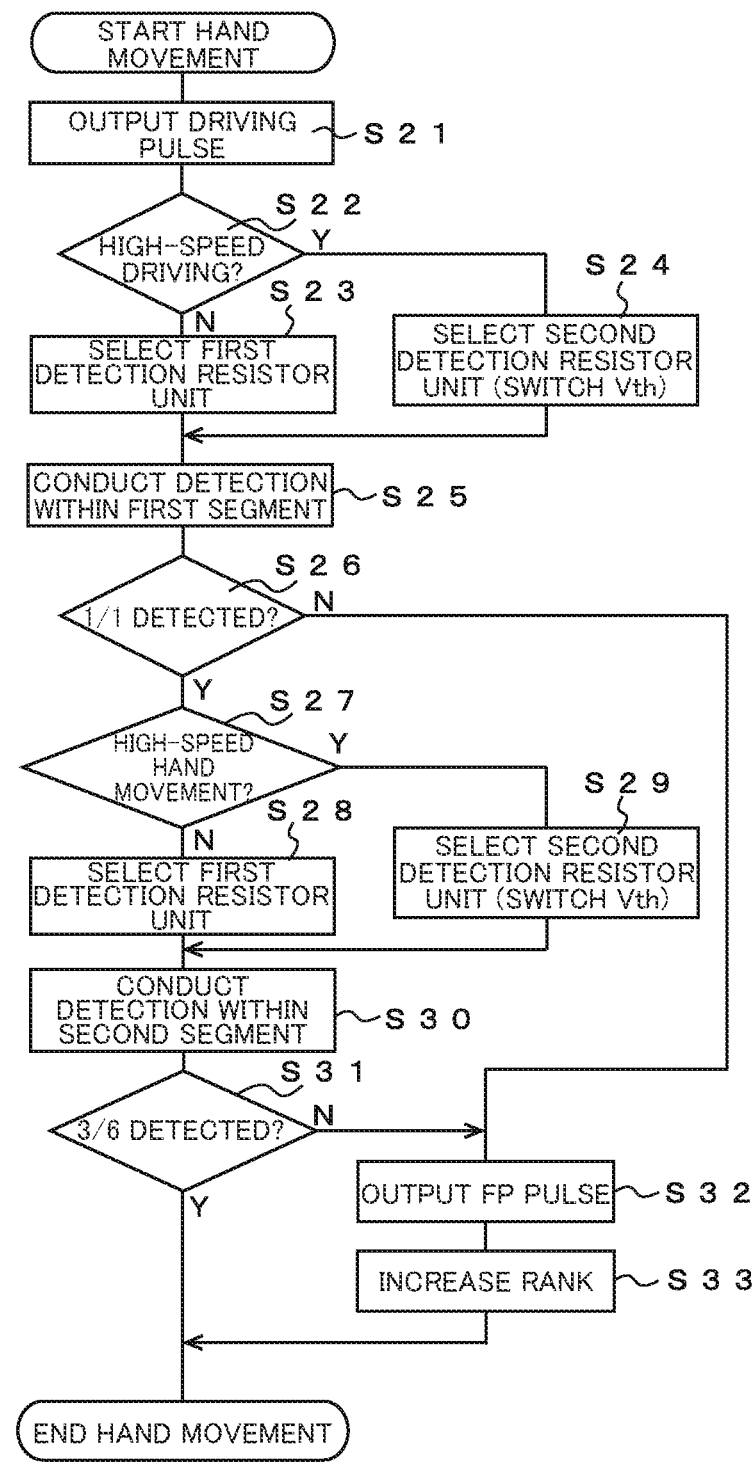
FIG. 11 is a flowchart for illustrating a rotation detection operation and driving of the step motor for the electronic watch according to the second embodiment of the present invention.

<Description of Rotation Detection Flow According to Second Embodiment: FIG. 11>

Next, a rotation detection operation flow of the step motor according to the second embodiment is described with reference to the flowchart of FIG. 11. The configuration of the electronic watch 100 is as described with reference to FIG. 9, and the circuit configurations of the driver circuit 20 and the detection resistor unit 50 are as described with reference to FIG. 10.

In FIG. 11, the electronic watch 100 outputs a predetermined driving pulse SP from the driving pulse generator circuit 5 in order to conduct hand movement, and the driving pulse SP is supplied to the step motor 30 from the driver circuit 20 (Step S21).

Next, the electronic watch 100 judges whether or not a present hand movement mode is set to the normal driving (e.g., one-second hand movements) or the high-speed driving (fast-forward hand movement) in order to execute rotation detection within the first detection segment G1 (Step S22). When the electronic watch 100 is set to the normal driving (i.e., a negative judgment is reached), the first detection resistor unit 51, which has a high detection resistance value, is selected to operate during the rotation detection operation within the first detection segment G1 (Step S23).

When the electronic watch 100 is set to the high-speed driving (i.e., an affirmative judgment is reached), the second detection resistor unit 52, which has a low detection resistance value, is selected to operate during the rotation detection operation within the first detection segment G1 (Step S24). The reason why the second detection resistor unit 52 having a low detection resistance value is selected for the high-speed driving is that the detection signals DS are generated across both ends of the detection resistors, and hence when the detection resistance value is low, the signal levels of the detection signals DS decrease, and as a result, the apparent threshold Vth of each of the gate circuits 40c and 40d for the detection signals DS increases, which makes it more difficult for the detection signals DS to be detected.

Therefore, by selecting the second detection resistor unit 52 having a low detection resistance value for the high-speed driving, the rotation detection condition for the high-speed driving is stricter, which allows a similar detection operation as in the first embodiment (i.e., the number of outputs of the detection pulses is decreased to make the detection condition stricter) to be achieved.

Next, the driving interval switch circuit 4 of the electronic watch 100 instructs the detection pulse generator circuit 10 to output, for example, one first detection pulse CP1 during the damped period t2 after the end of the output of the driving pulse SP as a rotation detection operation within the first detection segment G1, and the rotation detection circuit 40 detects the first detection signal DS1 generated by the first detection pulse CP1 (Step S25). The number of outputs of the first detection pulse CP1 is not limited.

Next, the rotation detection circuit 40 of the electronic watch 100 judges whether or not one first detection signal DS1 is detected from the one first detection pulse CP1 by detecting whether or not there is a first detection signal DS1 that has exceeded the predetermined threshold Vth (Step S26). When the judgment is affirmative (i.e., one DS1 signal is detected), the processing proceeds to Step S27, and when the judgment is negative (no DS1 signal is detected), a judgment of non-rotation is reached, and the processing proceeds to Step S32.

Next, when the judgment in Step 326 is affirmative, the processing proceeds to the rotation detection operation within the second detection segment G2, and the rotation detection circuit judges whether or not the present hand movement mode is set to the normal driving or the high-speed driving (Step S27). When the current hand movement mode is set to the normal driving (i.e., a negative judgment is reached), the first detection resistor unit 51, which has a high detection resistance value, is selected to operate during the rotation detection operation within the second detection segment G2 (Step S28).

When the electronic watch 100 is set to the high-speed driving (i.e., an affirmative judgment is reached), the second detection resistor unit 52, which has a low detection resistance value, is selected to operate during the rotation detection operation within the second detection segment G2 (Step S29). The reason why the second detection resistor unit 52 is selected for the high-speed driving is the same as for the rotation detection operation within the first detection segment G1.

Next, the driving interval switch circuit 4 of the electronic watch 100 instructs the detection pulse generator circuit 10 to output, for example, six second detection pulses CP2 as a rotation detection operation within the second detection segment G2, and the rotation detection circuit 40 detects the second detection signal DS2 generated by the second detection pulse CP2 (Step S30). The number of outputs of the second detection pulse CP2 is not limited.

Next, the rotation detection circuit 40 judges whether or not, for example, three or more second detection signals DS2 are detected from six second detection pulses CP2 by detecting whether or not there is a second detection signal DS2 that has exceeded the predetermined threshold Vth (Step S31). When an affirmative judgment is reached (i.e., three or more signals DS2 are detected), the rotation detection circuit 40 judges that the rotor 31 has rotated normally, and hence finishes the driving and waits until the next driving.

When three or more second detection signals DS2 are not detected (i.e., a negative judgment is reached), the rotation detection circuit 40 judges that the rotor 31 is not rotating, and outputs the correction pulse FP (Step S32). In order to increase the driving force of the driving pulse SP, the rotation detection circuit 40 also increases the rank of the duty cycle of the driving pulse SP (Step S33), then finishes the driving, and waits until the next driving.

The induced current Ig within the second detection segment G2 decreases through attenuation with time (refer to FIG. 4). As a result, when the second detection resistor unit 52 having a low detection resistance value is selected for the high-speed driving, the signal levels of the second detection signals DS2 may be undetectable because the signal levels are too low. In such a case, within the second detection segment G2, the first detection resistor unit 51 may be selected even for the high-speed driving to increase the signal levels of the second detection signals DS2 so that the second detection signals DS2 can be detected more easily.

In this case, in the flowchart of FIG. 11, the judgment of Step S27 is deleted. Therefore, when an affirmative judgment is reached in Step S26, the processing proceeds to Step S28 unconditionally. As a result, within the second detection segment G2, the first detection resistor unit 51, which has a high detection resistance value, is always selected. The term "(switch Vth)" in Steps S24 and S29 refers to an operation in Modified Example 1 of the second embodiment, which is described later.

Figure 12:
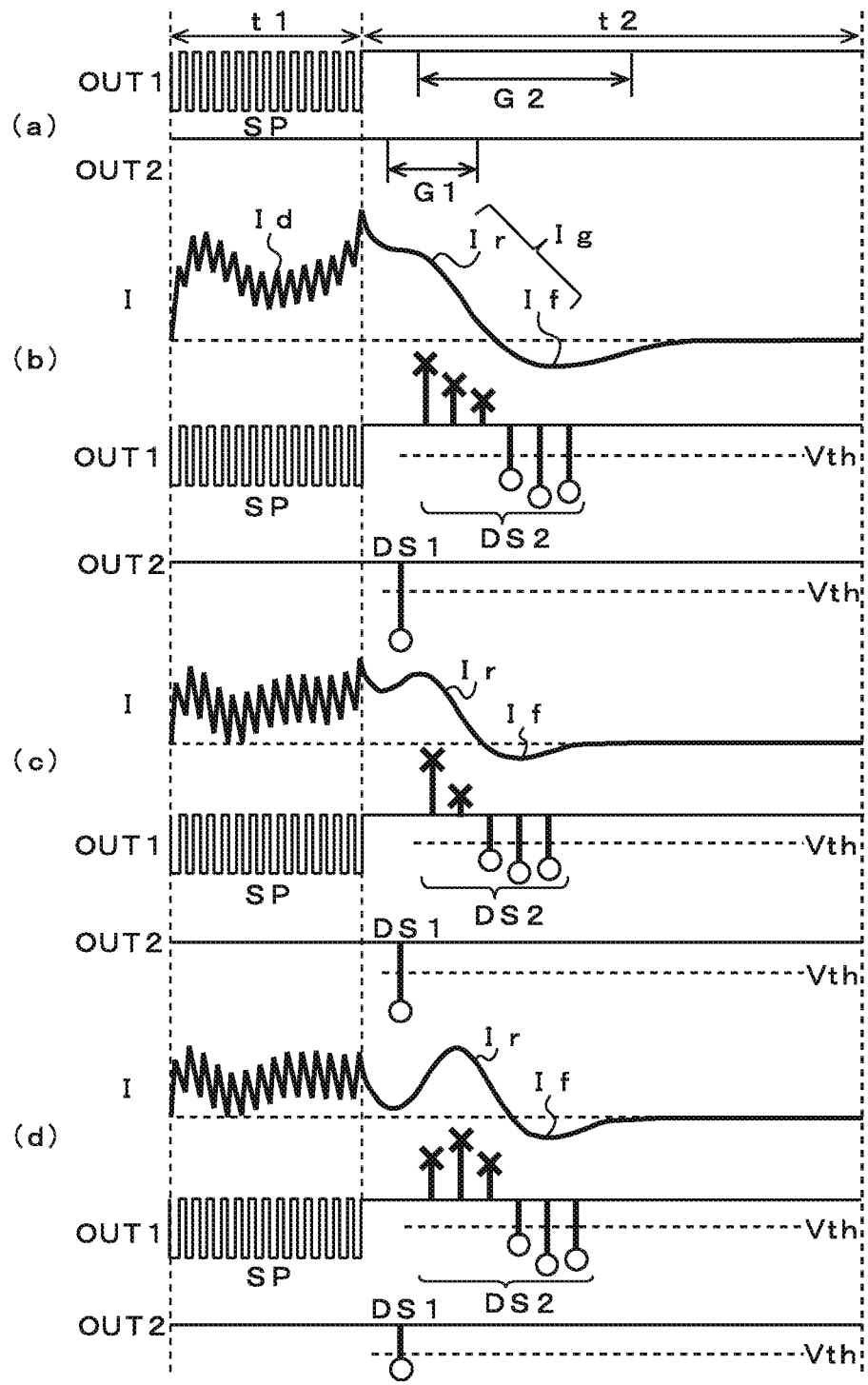
FIG. 12 are timing charts for illustrating the rotation detection operation during normal driving of the electronic watch according to the second embodiment of the present invention.

<Description of Rotation Detection Operation During Normal Driving According to Second Embodiment: FIG. 11 and FIGS. 12>

Next, the rotation detection operation during the normal driving according to the second embodiment is described with reference to the timing charts of FIG. 12. In this case, the normal driving is being conducted, and hence the first detection resistor unit 51 including the detection resistors R1 and R2, which have high resistance values, is selected for rotation detection within both the first detection segment G1 and the second detection segment G2. The operation flow is as described with reference to FIG. 11. Each of the induced currents Ig illustrated in the timing charts of FIG. 12 for illustrating operation according to the second embodiment, and the induced currents Ig illustrated in the timing charts of FIG. 13 and FIG. 14, which are described later, is an example in which the dummy Im does not occur.

In FIG. 12(a), there are illustrated the driving pulse SP to be output from the output OUT1 during the driven period t1, and the first detection segment G1 and the second detection segment G2 during the damped period t2. The reason why the first detection segment G1 and the second detection segment G2 temporally overlap is that when the judgment within the first detection segment G1 (Step S26: whether or not one first detection signal DS1 is detected from one first detection pulse CP1) is affirmative, the second detection segment G2 starts immediately thereafter.

In FIG. 12(b), FIG. 12(c), and FIG. 12(d), there are illustrated examples of how the first detection signals DS1 and the second detection signals DS2 are detected based on a difference in the speed of rotation of the rotor 31 of the step motor 30 during the normal driving. In FIG. 12(b), there is illustrated an example in which the rotor 31 has rotated quickly. This example illustrates that because the rotation of the rotor 31 is fast, a large bell Ir of the induced current Ig occurs immediately after the end of the driven period t1.

In this case, within the first detection segment G1, when one first detection pulse CP1 is output from the output OUT2, because a large bell Ir has already occurred, a first detection signal DS1 generated by the first detection pulse CP1 greatly exceeds the threshold Vth (the first DS1 signal is indicated by "o"). Therefore, an affirmative judgement is reached in Step S26, and the rotation detection operation immediately proceeds to the second detection segment G2 to be conducted next.

When the rotation detection operation proceeds to the second detection segment G2, six second detection pulses CP2 are output from the output OUT1, but because the bell Ir continues for a certain period in the induced current Ig, the signals from the head until the third signal of the second detection signals DS2 are not detected. Three of the second detection signals DS2, namely, the fourth to the sixth signals, at which the induced current Ig forms the well If, exceed the threshold Vth (the first to third DS2 signals are indicated by "x", and the fourth to sixth DS2 signals are indicated by "o"). As a result, an affirmative judgment is reached in Step S31, and the step motor 30 is judged to have rotated normally.

In FIG. 12(c), there is illustrated an example in which the rotation of the rotor 31 is relatively slow. In this example, a dip caused by the damped oscillation occurs in the induced current Ig. Within the first detection segment G1, when one first detection pulse CP1 is output from the output OUT2, the first detection signal DS1 generated from the first detection pulse CP1 exhibits a slight decrease in signal level due to the dip caused by the damped oscillation, but the signal level still easily exceeds the threshold Vth (the first DS1 signal is indicated by "o"). As a result, in Step S26, an affirmative judgment is reached, and the rotation detection operation proceeds to the second detection segment G2 to be conducted next.

When the rotation detection operation proceeds to the second detection segment G2, six second detection pulses CP2 are output from the output OUT1, but because the bell continues for a certain period in the induced current Ig, the signals from the head until the second signal of the second detection signals DS2 are not detected. The three second detection signals DS2 from the third signal onward exceed the threshold Vth (the first and second DS2 signals are indicated by "x", and the signals from the third DS2 signal onward are indicated by "o"). As a result, an affirmative judgment is reached in Step S31 immediately after the three second detection signals DS2 are detected and counted, and the step motor is judged to have rotated normally.

In FIG. 12(d), there is illustrated an example in which the rotation of the rotor 31 is slow due to the influence of an external magnetic field or the like. In this case, because the rotation of the rotor 31 is slow, a large dip due to the damped oscillation occurs in the induced current Ig, and hence when one first detection pulse CP1 is output from the output OUT2 within the first detection segment G1, the first detection signal DS1 generated from the first detection pulse CP1 exhibits a decrease in signal level due to the dip caused by the damped oscillation. However, the signal level still just exceeds the threshold Vth (the first DS1 signal is indicated by "o"). As a result, in Step S26, an affirmative judgment is reached, and the rotation detection operation proceeds to the second detection segment G2 to be conducted next.

When the rotation detection operation proceeds to the second detection segment G2, six second detection pulses CP2 are output from the output OUT1. However, because the bell Ir continues for a certain period in the induced current Ig due to the damped oscillation, the signals from the head until the third signal of the second detection signals DS2 are not detected. Three of the second detection signals DS2, namely, the fourth to the sixth signals, at which the induced current Ig forms the well If, exceed the threshold Vth (the first to third DS2 signals are indicated by "x", and the fourth to sixth DS2 signals are indicated by "o"). As a result, an affirmative judgment is reached in Step S31, and the step motor 30 is judged to have rotated normally.

Thus, the damped oscillation in the induced current Ig changes based on the speed of rotation of the rotor 31 of the step motor 30, which also causes a change in the signal levels of the first and second detection signals DS1 and DS2. However, as described above, for the normal driving, the first detection resistor unit 51, which has a high resistance value, is selected for both the first detection segment G1 and the second detection segment G2, and hence the signal levels of the first and second detection signals DS1 and DS2 do not attenuate. As a result, even when the rotation of the rotor 31 is relatively slow, the rotor 31 is judged to have rotated normally (refer to FIG. 12(d)).

The reason for this is that in the normal driving, e.g., one-second hand movement, even when rotation detection takes a certain amount of time, there is a still sufficient period of time until the next driving, and hence slow rotation of the rotor 31 is not a problem. When the first detection signals DS1 are not detected because none of the first detection signals DS1 exceed the threshold Vth, for example, a judgment of non-rotation is reached, Steps S32 and S33 are executed, the correction pulse FP is output, and the rank of the driving pulse SP is increased.

Figure 13:
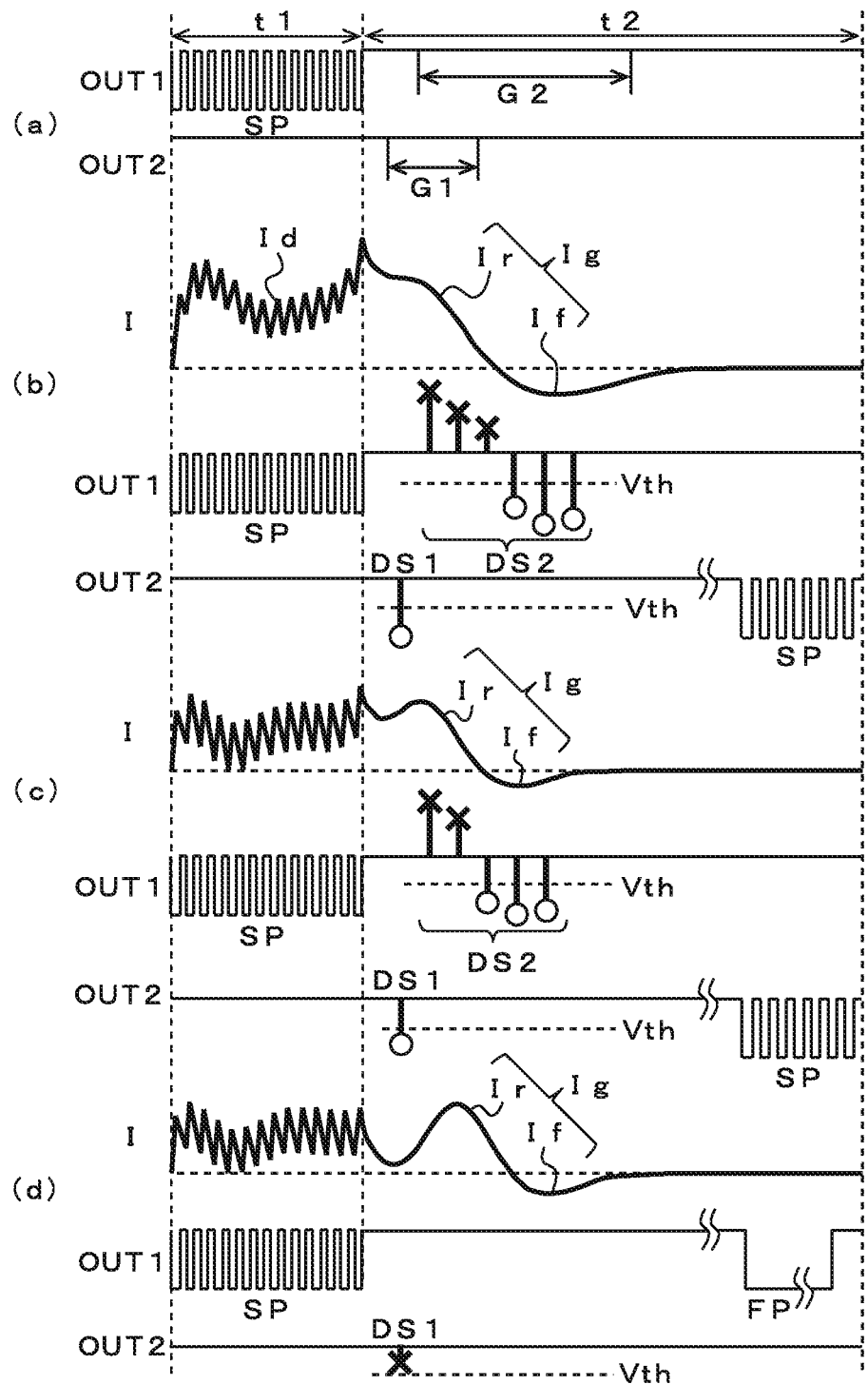
FIG. 13 are timing charts for illustrating the rotation detection operation during high-speed driving of the electronic watch according to the second embodiment of the present invention.

<Description of Rotation Detection Operation During High-Speed Driving According to Second Embodiment: FIG. 11 and FIGS. 13>

Next, the rotation detection operation during the high-speed driving according to the second embodiment, which is a feature of the present invention, is described with reference to the timing charts of FIG. 13. In the rotation detection operation examples illustrated in FIG. 13, the second detection resistor unit 52 having a low resistance value is selected for the rotation detection of the first detection segment G1, and the first detection resistor unit 51 having a high resistance value is selected for the rotation detection of the second detection segment G2. The operation flow is as described with reference to FIG. 11.

FIG. 13(a) is the same as FIG. 12(a), and hence a description thereof is omitted here.

In FIG. 13(b), FIG. 13(c), and FIG. 13(d), there are illustrated examples of how the first detection signals DS1 and the second detection signals DS2 are detected based on a difference in the speed of rotation of the rotor 31 of the step motor 30 during the high-speed driving. In FIG. 13(b), there is illustrated an example in which the rotor 31 has rotated quickly. This example illustrates that because the rotation of the rotor 31 is fast, a large bell Ir occurs in the induced current Ig immediately after the end of the driven period t1.

In this case, within the first detection segment G1, when one first detection pulse CP1 is output from the output OUT2, because the detection resistor R4 having a low resistance value is selected, the signal level of the first detection signal DS1 generated from the first detection pulse CP1 is comparatively lower than in the detection during the normal driving (refer to FIG. 12(b)). However, the signal level still exceeds the threshold Vth (the first DS1 signal is indicated by "o"). As a result, in Step S26, an affirmative judgment is reached, and the rotation detection operation proceeds to the second detection segment G2 to be conducted next.

When the rotation detection operation proceeds to the second detection segment G2, six second detection pulses CP2 are output from the output OUT1. In this case, within the second detection segment G2, because the detection resistor R1 having a high resistance value is selected, the detection operation is the same as that conducted within the second detection segment G2 during the normal driving illustrated in FIG. 12(b). Specifically, the bell Ir continues for a certain period in the induced current Ig, and hence the signals from the head until the third signal of the second detection signals DS2 are not detected. Three second detection signals DS2, namely, the fourth to the sixth signals exceed the threshold Vth (the first to third DS2 signals are indicated by "x", and the fourth to sixth DS2 signals are indicated by "o"). As a result, an affirmative judgment is reached in Step S31, the step motor 30 is judged to have rotated normally, and the next driving pulse SP is output from the output OUT2 6 mS later, for example.

In FIG. 13(c), there is illustrated an example in which the rotation of the rotor 31 is relatively slow. In this example, a dip in which the current value decreases between the driven period t1 and the bell Ir occurs in the induced current Ig due to the damped oscillation of the rotor 31. In this case, when one first detection pulse CP1 is output from the output OUT2 within the first detection segment G1, the signal level of the first detection signal DS1 decreases due to the influence of the dip in the induced current Ig.

Within the first detection segment G1, because the detection resistor R4 having a low resistance value is selected, even though the signal level of the first detection signal DS1 is comparatively even lower than the signal level during the normal driving (refer to FIG. 12(c)), the signal level still just exceeds the threshold Vth (the first DS1 signal is indicated by "o"). As a result, in Step S26, an affirmative judgment is reached, and the rotation detection operation proceeds to the second detection segment G2 to be conducted next.

When the rotation detection operation proceeds to the second detection segment G2, six second detection pulses CP2 are output from the output OUT1. In this case, within the second detection segment G2, because the detection resistor R1 having a high resistance value is selected, the detection operation is the same as that conducted within the second detection segment G2 during the normal driving illustrated in FIG. 12(c). Specifically, the bell Ir continues for a certain period in the induced current Ig, and hence the signals from the head until the second signal of the second detection signals DS2 are not detected. Three second detection signals DS2, namely, the third and subsequent signals exceed the threshold Vth (the first and second DS2 signals are indicated by "x", and the signals from the third DS2 signal onward are indicated by "o"). As a result, immediately after the three second detection signals DS2 have been detected and counted, an affirmative judgment is reached in Step S31, the step motor 30 is judged to have rotated normally, and the next driving pulse SP is output from the output OUT2 6 mS later, for example.

In FIG. 13(d), there is illustrated an example in which the rotation of the rotor 31 is slow due to the influence of an external magnetic field or the like. In this example, because the rotation of the rotor 31 is slow, a large dip in which the current value decreases between the driven period t1 and the bell Ir occurs in the induced current Ig due to the damped oscillation of the rotor 31. In this case, within the first detection segment G1, when one first detection pulse CP1 is output from the output OUT2, the signal level of the first detection signal DS1 is decreased by a large amount due to the influence of the large dip in the induced current Ig.

Within the first detection segment G1, because the detection resistor R4 having a low resistance value is selected, the signal level of the first detection signal DS1 is comparatively even lower than the signal level during the normal driving (refer to FIG. 12(d)), and hence the signal level does not exceed the threshold Vth (the first DS1 signal is indicated by "x").

As a result, in Step S26 illustrated in FIG. 11, a negative judgment is reached, and the rotor 31 is judged to have not rotated. Then, the processing immediately proceeds to Step S32, and the correction pulse FP for driving compensation is output from the output OUT1. Based on the output of the correction pulse FP, the rotor 31 having slow rotation can be caused to reliably rotate.

Next, after the output of the correction pulse FP, processing for increasing the rank of the duty cycle of the driving pulse SP to strengthen the driving force of the driving pulse SP to be output next is executed (Step S33). The driving force of the next driving pulse SP is strengthened by the processing for increasing the rank. As a result, the rotation of the rotor 31 becomes faster, and approaches the timing illustrated in FIG. 13(b).

Thus, a large and bulging bell Ir occurs in the induced current Ig of the step motor 30 when the rotation of the rotor 31 is fast (refer to FIG. 13(b)), but a dip occurs between the driven period t1 and the bell Ir due to the damped oscillation when the rotation of the rotor 31 is slow (refer to FIG. 13(d)). In this embodiment, which focuses on the phenomenon that the signal level of the first detection signal DS1 generated from the first pulse of the first detection pulses CP1 within the first detection segment G1 is caused to decrease by the dip occurring in the induced current Ig, the rotation detection circuit 40 is configured to quickly judge a decrease in the rotation speed of the rotor 31 by judging whether or not the first detection signals DS1, which have a signal level that fluctuates in accordance with the rotation speed of the rotor 31, are detectable by decreasing the detection resistance value and increasing the apparent threshold Vth.

Thus, in the second embodiment, similarly to the first embodiment, when driving the step motor 30 at high speed, a stricter rotation detection condition is set by reducing the detection resistance value of the detection resistor unit 50 to decrease the signal level of the detection signals DS, and increasing the apparent threshold Vth for the detection signals DS. As a result, a decrease in the rotation speed of the rotor 31 is quickly judged as being non-rotation, and the optimum high-speed driving can be continued by strengthening the driving force of the step motor, to thereby provide an electronic watch that achieves stable high-speed driving.

When the first embodiment and the second embodiment are combined, during the high-speed driving, the number of outputs of the detection pulses may be decreased compared with during the normal driving, and the apparent threshold Vth may be increased by changing the detection resistance value. This enables an electronic watch to be achieved that is configured to detect a slight decrease in the rotation speed of the rotor 31 by judging rotation/non-rotation of the step motor 30 even more quickly, to thereby maintain the fastest possible high-speed driving.

<Description of Configuration According to Modified Example 1 of Second Embodiment: FIG. 10>

Next, a configuration of Modified Example 1 of the second embodiment is described with reference to FIG. 10.

Modified Example 1 of the second embodiment has a feature that the same effect as that obtained by reducing the resistance value of the detection resistor is obtained by controlling the threshold Vth of the rotation detection circuit 40 for judging whether or not the detection signals are detectable by the driving interval switch circuit 4, and increasing the threshold Vth during the high-speed driving.

In FIG. 10, in Modified Example 1, a control terminal Cv is arranged for each of the two gate circuits 40c and 40d in the rotation detection circuit 40. The detection control signal P4 from the driving interval switch circuit 4 is input to those gate circuits 40c and 40d. The gate circuits 40c and 40d have a function for changing the threshold Vth for the input signals (i.e., the first and second detection signals DS1 and DS2) based on the detection control signal P4.

More specifically, when the driving interval switch circuit 4 sets the detection control signal P4 to a logic "1" during the high-speed driving, the gate circuits 40c and 40d function such that the threshold Vth is higher than during the normal driving. As an example, when the threshold Vth is about ½ the power supply voltage during the normal driving, the threshold Vth is controlled so as to be about ⅔ the power supply voltage during the high-speed driving. In Modified Example 1, it is not necessary to switch the detection resistor, and hence the detection resistor unit 50 may include only the first detection resistor unit 51.

Figure 14:
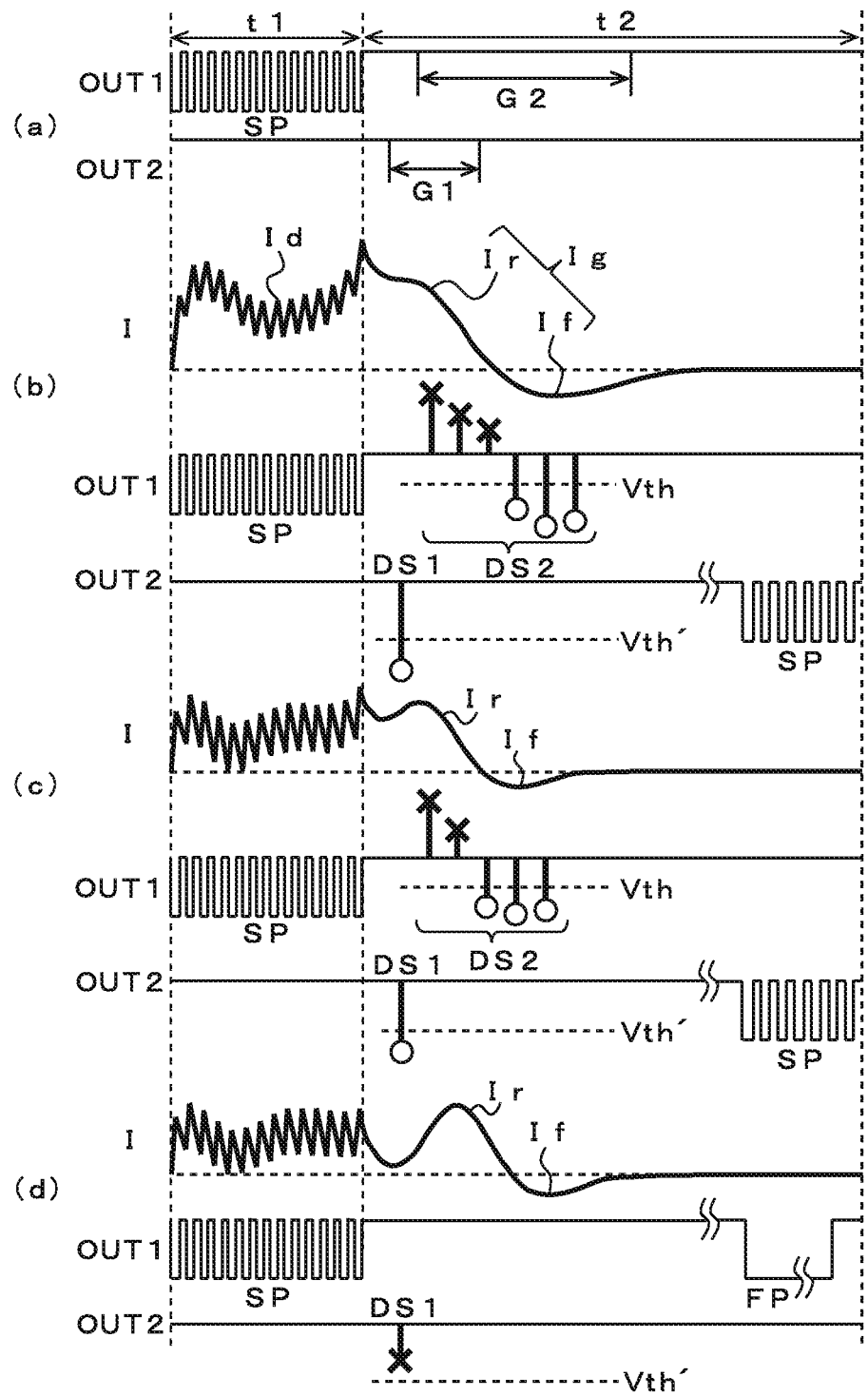
FIG. 14 are timing charts for illustrating the rotation detection operation during high-speed driving of an electronic watch according to Modified Example 1 of the second embodiment of the present invention.

<Description of Rotation Detection Operation According to Modified Example 1 of Second Embodiment: FIG. 10, FIG. 11, and FIGS. 14>

Next, the rotation detection operation during the high-speed driving according to Modified Example 1 of the second embodiment is described with reference to the flowchart of FIG. 11 and the timing charts of FIG. 14. The configurations are as described with reference to FIG. 10. In FIG. 11, when the electronic watch is set to the high-speed driving, Steps S24 and S29 are executed, but in Modified Example 1, the second detection resistor unit is not selected. Instead, in Steps S24 and S29, the driving interval switch circuit 4 switches the threshold Vth of each of the gate circuits 40c and 40d by the detection control signal P4 to set the threshold Vth to be higher than during the normal driving.

As described above, the induced current Ig within the second detection segment G2 decreases through attenuation with time, and hence the threshold Vth of the gate circuits 40c and 40d may be set so as to be high in Step S24 for only rotation detection within the first detection segment G1. In this case, Steps S27 and S29 are unnecessary.

In the timing charts of FIG. 14, there are illustrated examples of the detection operation when the threshold Vth of each of the gate circuits 40c and 40d is set to be high for only rotation detection within the first detection segment G1 during the high-speed driving. The basics of the timing charts of FIG. 14 are the same as in the above-mentioned timing charts of FIGS. 13 for the high-speed driving according to the second embodiment, and hence a duplicate description thereof is omitted here.

In the operations according to Modified Example 1 illustrated in FIG. 14, within both the first detection segment G1 and the second detection segment G2, the first detection resistor unit 51, which has a high detection resistance value, is connected. Therefore, the signal levels of the first detection signals DS1 do not attenuate, and are higher than the signal levels illustrated in FIG. 13. A threshold Vth' within the first detection segment G1 has a value (i.e., an absolute value) that is set to a high level (indicated by the dashed line). In FIG. 14(b), there is illustrated a case in which the rotation of the rotor 31 is fast. In FIG. 14(c), there is illustrated a case in which the rotation is relatively slow. In FIG. 14(d), there is illustrated a case in which the rotation is slow.

In the rotation detection examples illustrated in FIG. 14(b) and FIG. 14(c), the first detection signal DS1 generated within the first detection segment G1 has a high signal level, and hence exceeds the threshold Vth'. The second detection signals DS2 within the subsequent second detection segment G2 are also detected. As a result, the rotor 31 is judged to have rotated normally, and the next driving pulse SP is output from the output OUT2.

On the other hand, in the rotation detection example illustrated in FIG. 14 (d), because the rotation of the rotor 31 is slow, the signal level of the first detection signal DS1 generated within the first detection segment G1 decreases due to a dip in the induced current Ig, and hence the signal level does not exceed the threshold Vth' (the DS1 signal is indicated by "x"). As a result, non-rotation is immediately judged, and the correction pulse FP is output from the output OUT1. Then, the rank is increased to strengthen the driving force of the driving pulse SP, to thereby continue the high-speed driving.

Thus, in Modified Example 1 of the second embodiment, as described above, the rotation detection condition during the high-speed driving may be set to be stricter by increasing the threshold Vth of the gate circuits 40c and 40d in order to judge whether or not the detection signals are detectable during the high-speed driving. As a result, a decrease in the rotation speed of the rotor 31 may be quickly judged as being non-rotation, to thereby achieve the same effects as in the first embodiment.

Figure 15:
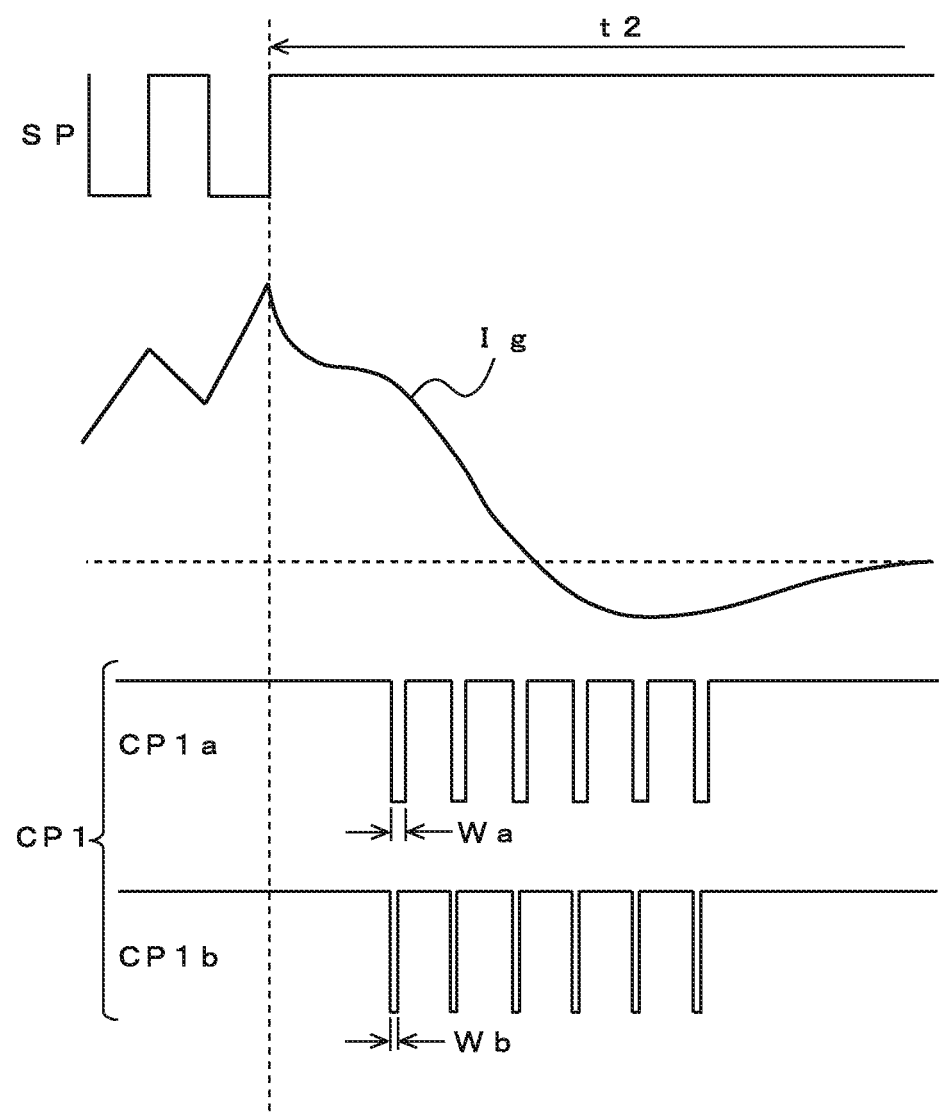
FIG. 15 is a timing chart for illustrating a pulse width of the detection pulse during the high-speed driving of an electronic watch according to Modified Example 2 of the second embodiment of the present invention.

<Description of Rotation Detection Operation According to Modified Example 2 of Second Embodiment: FIG. 9 and FIG. 15>

Next, a rotation detection operation according to Modified Example 2 of the second embodiment is described with reference to the block diagram of FIG. 9 and the timing chart of FIG. 15. Modified Example 2 of the second embodiment has a feature of strengthening the action of an electromagnetic brake on a rotor by setting the pulse widths of the detection pulses to be narrower during the high-speed driving than during the normal driving under the control of the driving interval switch circuit 4.

In the block diagram of FIG. 9, in Modified Example 2, the driving interval switch circuit 4 is configured to set the pulse widths to be narrower during the high-speed driving than during the normal driving by controlling the detection pulse generator circuit 10 with the pulse generation control signal P2, and switching the pulse widths of the first detection pulse CP1 and the second detection pulse CP2.

In the timing chart of FIG. 15, as an example, it is illustrated that the pulse width of the first detection pulse CP1 is switched during the normal driving and during the high-speed driving. In FIG. 15, the induced current Ig occurs after the driving pulse SP has ended and the damped period t2 has started. A predetermined number of the first detection pulses CP1 is output in accordance with the timing at which the induced current Ig occurs.

A first detection pulse CP1a is a detection pulse waveform during the normal driving, and a first detection pulse CP1b is a detection pulse waveform during the high-speed driving. A relation between a pulse width Wa of the first detection pulse CP1a and a pulse width Wb of the first detection pulse CP1b is Wa>Wb. In the following, the first detection pulse CP1 is described, but the second detection pulse CP2 is set similarly. Thus, in Modified Example 2, the pulse widths Wb of the first and second detection pulses CP1 and CP2 during the high-speed driving are set to be narrower than the pulse widths Wa of the first and second detection pulses CP1 and CP2 during the normal driving under the control of the driving interval switch circuit 4.

The reason for setting the pulse widths of the first and second detection pulses CP1 and CP2 to be narrower during the high-speed driving is that, during the interval in which the detection pulses are being output, the coil 33 of the step motor is connected to a detection resistor and is close to being in an open state, and hence it is more difficult during that interval for the induced current Ig to flow, which weakens the action of the electromagnetic brake on the rotor 31 and prolongs the damped oscillation of the rotor 31.

However, during the high-speed driving, it is necessary to cause the damped oscillation of the rotor 31 to converge as quickly as possible in order to conduct the next driving, and hence it is preferred that the interval in which the electromagnetic brake is weak be as short as possible. As a result, in Modified Example 2, control is conducted for setting the pulse widths of the detection pulses during the high-speed driving to be narrower, to thereby lengthen the interval in which the electromagnetic brake is acting, and cause the damped oscillation of the rotor 31 to converge even slightly faster.

Thus, in Modified Example 2 of the second embodiment, the effect of the electromagnetic brake on the rotor 31 is strengthened by setting the pulse widths of the detection pulses to be narrower during the high-speed driving, which causes the damped oscillation of the rotor 31 to converge more quickly, to thereby allow an electronic watch capable of being driven at even higher speed to be provided.

Third Embodiment

Figure 16:
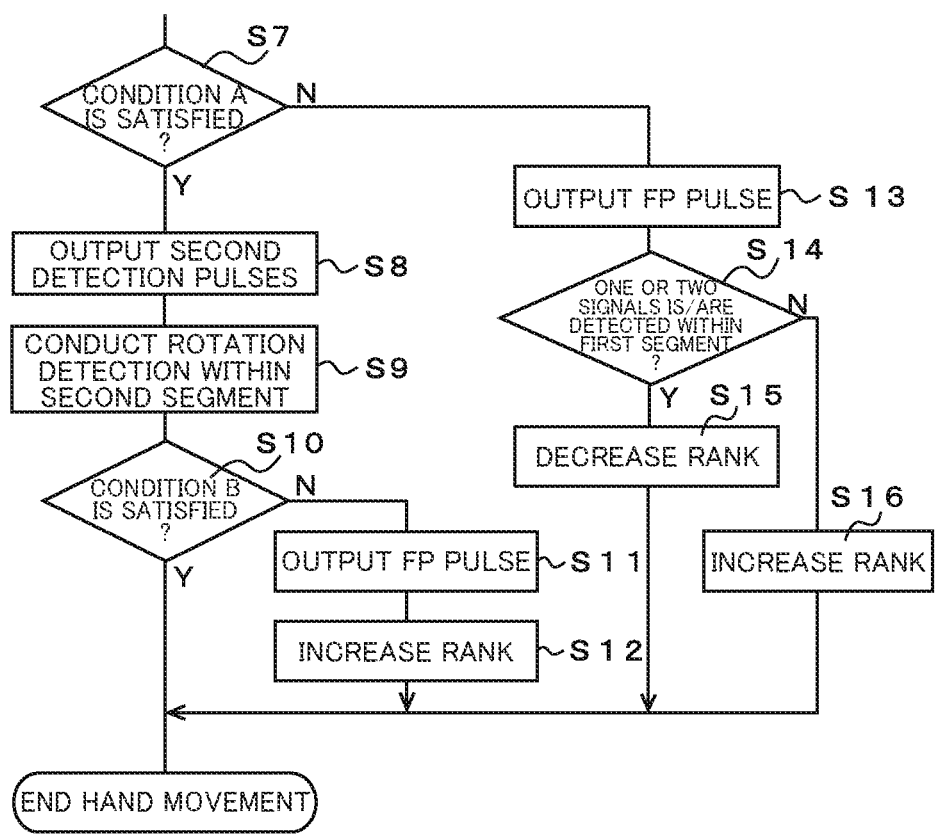
FIG. 16 is a flowchart for illustrating a rotation detection operation and driving of the step motor for an electronic watch according to a third embodiment of the present invention.
Figure 17:
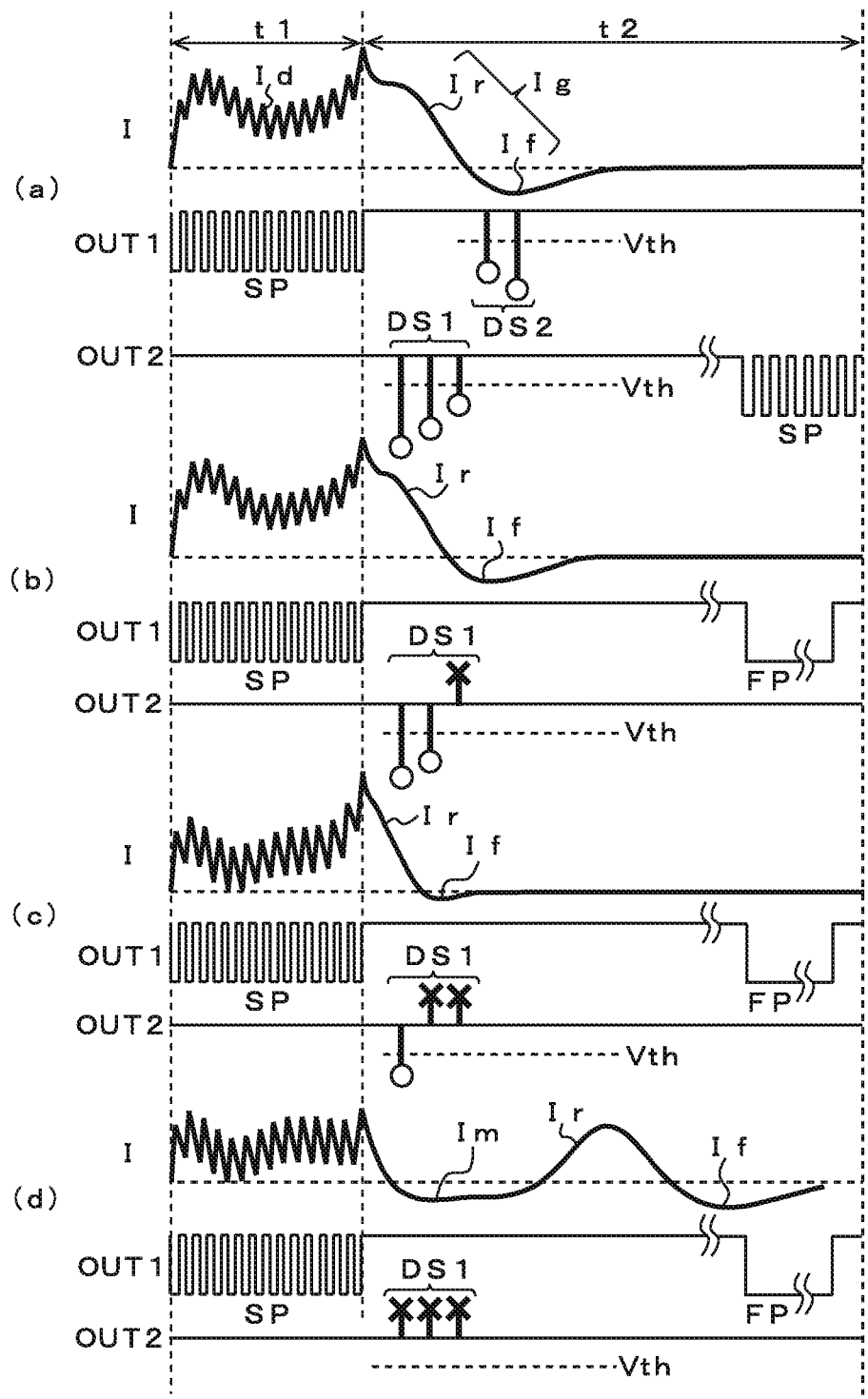
FIG. 17 are timing charts for illustrating the rotation detection operation during high-speed driving of the electronic watch according to the third embodiment of the present invention.

<Description of Operation of Electronic Watch According to Third Embodiment: FIG. 16 and FIGS. 17>

Next, operation of an electronic watch according to a third embodiment of the present invention is described with reference to the flowchart of FIG. 16 and the timing charts of FIG. 17. The basic configuration of the third embodiment is the same as that in the first embodiment, and hence the configuration is as described with reference to FIG. 1.

In the flowchart of FIG. 16, processing conducted from Step S7 onward in the flowchart according to the first embodiment (FIG. 5) is illustrated. Specifically, in the third embodiment, the operation flow from Step S7 onward of the first embodiment is different. More specifically, control is conducted such that Step S13 to Step S16 are added after the negative judgment in Step S7.

In FIG. 16, when a negative judgment is reached in the judgment of the condition A in Step S7 during the high-speed driving, a judgment of non-rotation is reached, and the correction pulse FP for compensation of driving is output (Step S13).

Next, in the detection operation within the first detection segment G1 (refer to Step S6 of FIG. 5), it is judged whether or not the first signal at the head of the first detection signals DS1, or the signals from the head until the second signal of the first detection signals DS1, is/are detected, and whether or not subsequent first detection signals DS1 are not detected (Step S14).

When the judgment in Step S14 is affirmative (i.e., that one signal or two signals is/are detected), the driving interval switch circuit 4 judges that the rotation speed of the rotor 31 is too fast because the driving force of the driving pulse SP is too strong, and weakens the driving force by decreasing the rank of the duty cycle of the driving pulse SP (Step S15). Then, the driving interval switch circuit 4 finishes the driving, and waits until the next driving.

When the judgment in Step S14 is negative (i.e., that no signals are detected), the driving interval switch circuit 4 judges that the driving force of the driving pulse SP is weak, and strengthens the driving force by increasing the rank of the duty cycle of the driving pulse SP (Step S16). Then, the driving interval switch circuit 4 finishes the driving, and waits until the next driving. The judgment conducted in Step S14 may also be conducted based on whether or not at least the head pulse is detected, without regard to the number of detections of the first detection signals DS1. The operations of Steps S7 to S12 are the same as those in the first embodiment, and hence a description thereof is omitted here.

Next, the rotation detection operation according to the third embodiment is described with reference to the timing charts of FIG. 17. In FIG. 17(a), there is illustrated an example in which the rotor 31 of the step motor 30 is rotating normally. In this example, three first detection signals DS1 are detected, and then two second detection signals DS2 are detected. Therefore, in the flowchart of FIG. 16, an affirmative judgment is reached in both Steps S7 and S10, the rotor 31 is judged to have rotated normally, and the next driving pulse SP is output from the output OUT2.

In FIG. 17(b) and FIG. 17 (c), there are illustrated examples in which the rotation of the rotor 31 is too fast because the driving force to the step motor 30 is too strong, and hence the function of this embodiment is conducted. In FIG. 17(b), there is illustrated an example in which the rotation of the rotor 31 is too fast, and hence after the start of the damped period t2, the bell Ir of the induced current Ig ends after a short period of time, and the well If is formed.

In this case, the first and second signals of the first detection signals DS1 are detected as having exceeded the threshold Vth, but the third signal of the first detection signals DS1 is not detected because the induced current Ig is in the well If area (the first and second DS1 signals are indicated by "o", and the third DS1 signal is indicated by "x"). As a result, in the flowchart of FIG. 16, a negative judgment is reached in Step S7, and the correction pulse FP is output. Then, an affirmative judgment is reached in Step S4 (two DS1 signals are detected: driving force is judged as being too strong), and the rank is decreased (Step S15).

In FIG. 17(c), there is illustrated an example in which the rotation of the rotor 31 is too fast by an even greater degree, and hence after the start of the damped period t2, the bell Ir ends after an even shorter period of time, and the well If is formed. In this case, the first signal of the first detection signals DS1 is detected as having exceeded the threshold Vth, but the second and subsequent signals of the first detection signals DS1 are not detected because the induced current Ig is in the well If area (the first DS1 signal is indicated by "o", and the second and third DS1 signals are indicated by "x"). As a result, in the flowchart of FIG. 16, a negative judgment is reached in Step S7, and the correction pulse FP is output. Then, an affirmative judgment is reached in Step S14 (one DS1 signal is detected: driving force is judged as being too strong), and the rank is decreased (Step S15).

In FIG. 17(d), there is illustrated an example in which the rotation of the rotor 31 is too slow, and hence after the start of the damped period t2, the dummy Im continues in the induced current Ig. Therefore, not even one first detection signal DS1 is detected, including the first signal. As a result, in the flowchart of FIG. 16, a negative judgment is reached in Step S7, and the correction pulse FP is output. Then, a negative judgment is reached in Step S14 (i.e., the driving force is judged as being weak), and the rank is increased (Step S16).

Thus, in the third embodiment, after a judgment of non-rotation is reached in Step S7, the electronic watch 1 judges whether or not the bell Ir of the induced current Ig ends after a short period of time based on the detection state of the first detection signals DS1. When it is judged that the bell Ir ends after a short period of time, the electronic watch 1 judges that the driving force to the step motor 30 is too strong, and decreases the duty cycle (i.e., decreases the rank) of the driving pulse SP.

Therefore, when the driving force of the driving pulse SP is too strong, the rank is decreased, and when the driving force of the driving pulse SP is too weak, the rank is increased. This enables the step motor 30 to continue the high-speed driving based on an optimized rotation speed, like that illustrated in FIG. 17(a). As a result, there may be provided an electronic watch configured to achieve stable high-speed driving, in which the high-speed driving of the step motor is optimized while achieving low-power driving in which only the necessary amount of driving force is supplied.

Although not shown in the flowchart of FIG. 16, when an affirmative judgment is reached in both Steps S7 and S10, and the number of times that the rotor 31 is judged to have normally rotated exceeds a predetermined number (e.g., 256 times), it may be judged that the rotation of the step motor 30 is stable, and hence that the rank may be decreased in order to conduct low-power driving.

Figure 18:
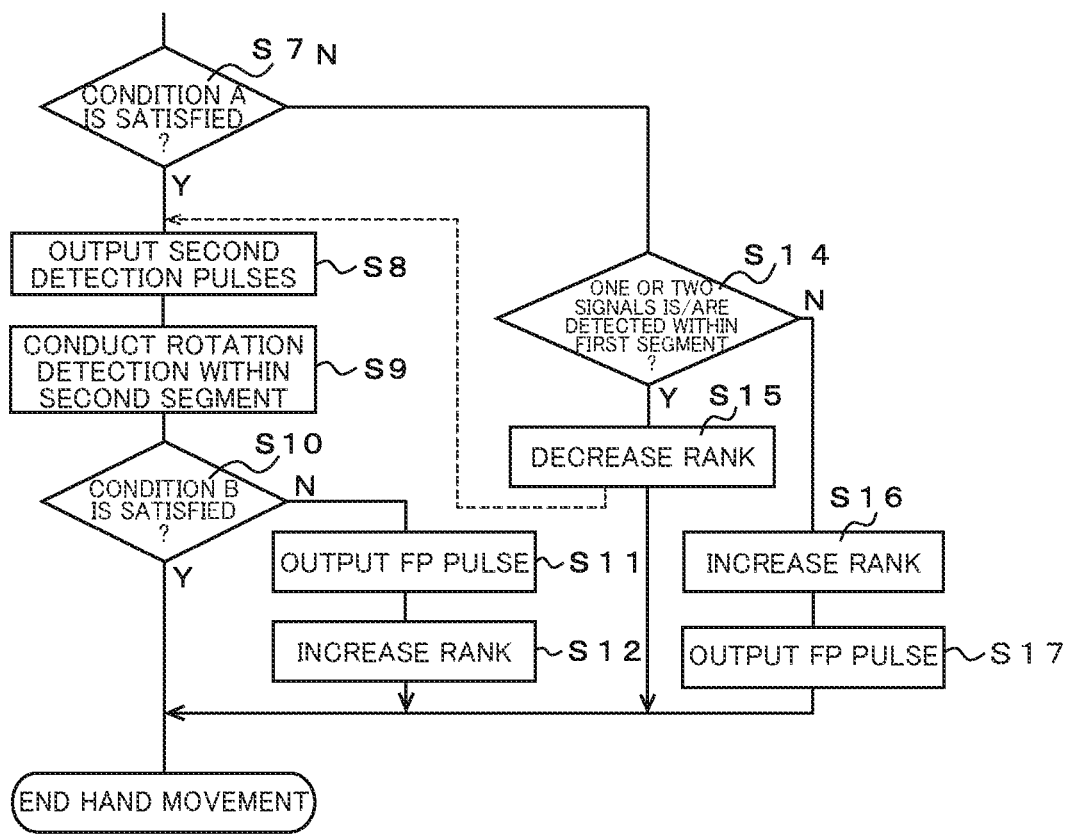
FIG. 18 is a flowchart for illustrating a rotation detection operation and driving of the step motor for an electronic watch according to a modified example of the third embodiment of the present invention.
Figure 19:
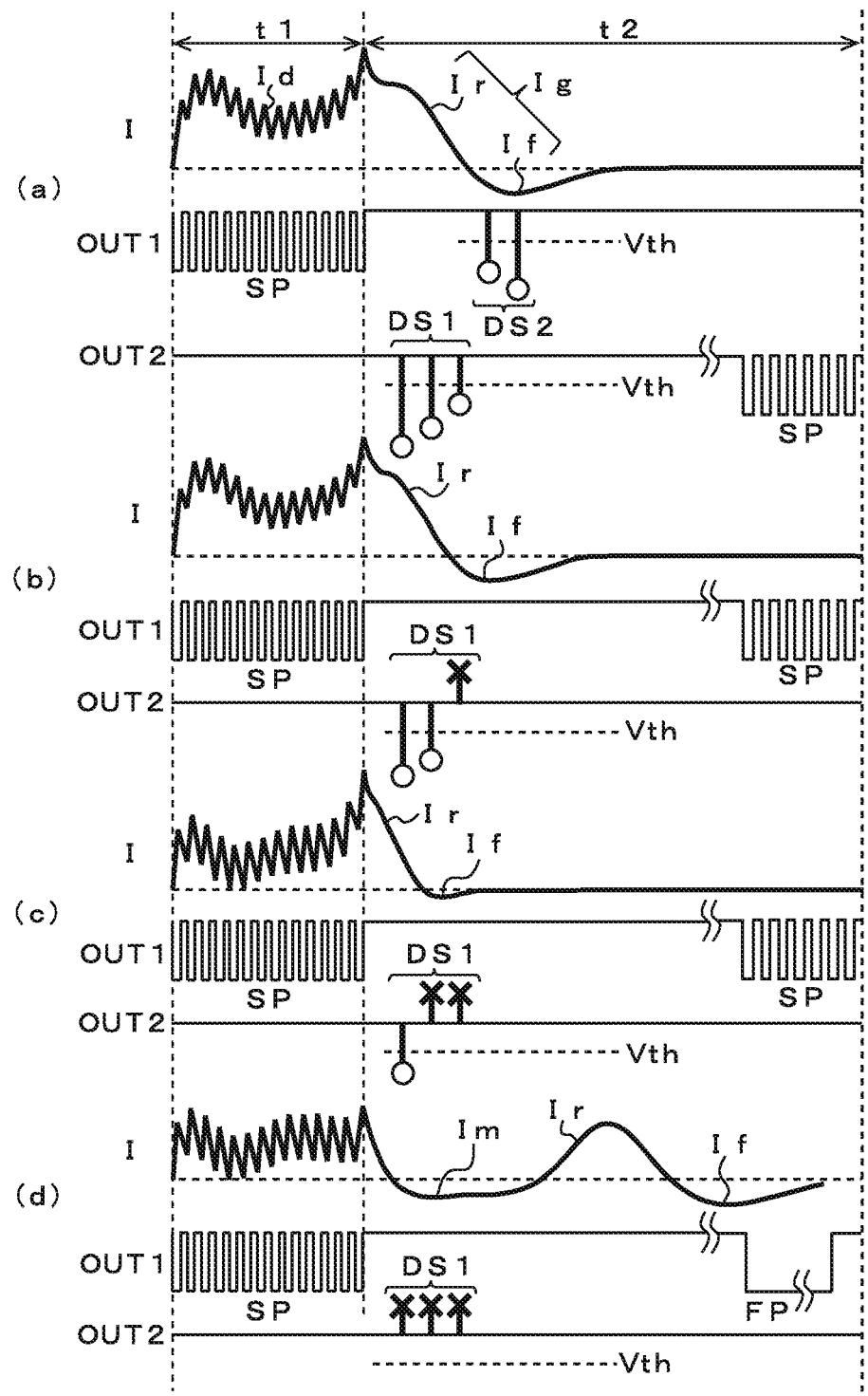
FIG. 19 are timing charts for illustrating the rotation detection operation during high-speed driving of the electronic watch according to the modified example of the third embodiment of the present invention.

<Description of Operation of According to Modified Example of Third Embodiment: FIG. 18 and FIGS. 19>

Next, operation of an electronic watch according to a modified example of the third embodiment is described with reference to the flowchart of FIG. 18 and the timing charts of FIG. 19. The basic configuration in this modified example is the same as that in the third embodiment and the first embodiment, and hence the configuration is as described with reference to FIG. 1. This modified example has a feature of suppressing power consumption by suppressing the output of unnecessary correction pulses when the rank of the driving pulse is decreased due to a judgment that the rotation speed of the rotor 31 is too fast.

In the flowchart of FIG. 18, processing conducted from Step S7 onward in the flowchart according to the first embodiment (FIG. 5) is also illustrated. Specifically, in this modified example, control is conducted such that Steps S14 to S17 are added after the negative judgment in Step S7 of the first embodiment.

In FIG. 18, when a negative judgment is reached in the judgment of the condition A in Step S7 during the high-speed driving, it is judged that there is a possibility of non-rotation, and the processing proceeds to Step S14. The reason why, unlike in the third embodiment, the correction pulse FP for compensation of driving is not immediately output is that a negative judgment in the judgment of the condition A not only includes cases in which the rotor 31 is not rotating and cases in which rotation is too slow because the driving force is too weak, but may also include cases in which the rotation of the rotor 31 is too fast because the driving force is too strong. When the rotation of the rotor 31 is too fast, it may be considered that limitations on the high-speed driving imposed by the rotor 31 rotating normally or imposed by a delay in rotation detection do not occur, and hence the correction pulse FP is unnecessary.

In Step S14, similarly to the third embodiment, in the detection operation within the first detection segment G1 (refer to Step S6 of FIG. 5), it is judged whether or not the first signal at the head of the first detection signals DS1, or the signals from the head until the second signal of the first detection signals DS1, is/are detected, and whether or not subsequent first detection signals DS1 are not detected.

When the judgment in Step S14 is affirmative, this may mean that the rotation speed of the rotor 31 is too fast because the driving force of the driving pulse SP is strong. Therefore, in this case, the driving interval switch circuit 4 weakens the driving force by decreasing the rank of the duty cycle of the driving pulse SP (Step S15). At this time, the rotor 31 is rotating normally, and hence the driving interval switch circuit 4 finishes the driving without outputting the correction pulse FP, and waits until the next driving.

On the other hand, when the judgment in Step S14 is negative, this may mean that the rotation speed of the rotor 31 is too slow or that the rotor 31 is not rotating because the driving force of the driving pulse SP is weak. Therefore, in this case, the driving interval switch circuit 4 strengthens the driving force by increasing the rank of the duty cycle of the driving pulse SP (Step S16), and outputs the correction pulse FP for driving compensation (Step S17). Then, the driving interval switch circuit 4 finishes the driving, and waits until the next driving. The operations of Steps S7 to S12 illustrated in FIG. 18 are the same as those in the first embodiment, and hence a description thereof is omitted here.

Next, the rotation detection operation according to the modified example of the third embodiment is described with reference to the timing charts of FIG. 19. In FIG. 19(a), there is illustrated an example in which the rotor 31 of the step motor is rotating normally. This example is the same as that illustrated in FIG. 17 (a). Therefore, in the flowchart of FIG. 18, an affirmative judgment is reached in both Steps S7 and S10, the rotor 31 is judged to have rotated normally, and the next driving pulse SP is output from the output OUT2.

In FIG. 19(b) and FIG. 19(c), there are illustrated examples in which the rotation of the rotor 31 is too fast because the driving force to the step motor 30 is too strong, and hence a similar state to that in each of the above-mentioned FIG. 17(b) and FIG. 17(c) is shown. Specifically, in both FIG. 19(b) and FIG. 19(c), there are illustrated examples in which the rotation of the rotor 31 is too fast, and hence after the start of the damped period t2, the bell Ir of the induced current Ig ends after a short period of time, and the well If is formed. In those cases, in the flowchart of FIG. 18, the flow until a negative judgment is reached in Step S7 is the same as that of FIG. 16 described in the third embodiment. However, in this modified example, the correction pulse FP is not immediately output, and the subsequent judgment of Step S14 is conducted. As a result, an affirmative judgment is reached (one or two DS1 signal(s) is/are detected: driving force is judged as being too strong), and the rank is decreased (Step S15). Because the correction pulse FP is not output, and the next driving pulse SP is output without waiting for the correction pulse FP to be output, unnecessary energy consumption is suppressed, and a delay in the high-speed driving does not occur.

In contrast, in FIG. 19(d), there is illustrated an example in which the rotation of the rotor 31 is too slow, and hence a similar state to that in FIG. 17(d) is illustrated. Specifically, after the start of the damped period t2, the dummy Im continues in the induced current Ig, and not even one first detection signal DS1 is detected. As a result, in the flowchart of FIG. 18, a negative judgment is reached in Step S7, and a negative judgment is then reached in Step S14 (i.e., the driving force is judged as being weak). Then, the rank is increased (Step S16), and the correction pulse FP is output (Step S17).

Thus, in this modified example, when the rotation of the rotor 31 is too fast in the third embodiment, the high-speed driving is continued based on an optimized rotation speed like that illustrated in FIG. 19(a), while suppressing unnecessary energy consumption caused by outputting unnecessary correction pulses FP, and avoiding delays in the high-speed driving.

As shown by the dashed arrow in FIG. 18, the detection operation within the second detection segment G2 may also be conducted by decreasing the rank of the duty cycle of the driving pulse SP in Step S15, and then advancing to Step S8. Conducting the detection operation in this manner enables the presence/absence of rotation of the rotor 31 to be detected even more reliably.

However, in this case, care needs to be taken as to how the case illustrated in FIG. 19(c) is handled. Specifically, when the rotation of the rotor 31 is far too strong because the driving force is far too strong, before proceeding to the second detection segment G2, there is a possibility that the well If attenuates, meaning that not even one second detection signal DS2 is detected, or that the number of detections does not satisfy the condition B. Under such conditions, a negative judgment is reached in Step S10 in the flowchart of FIG. 18, and the rank of the duty cycle of the driving pulse SP, which had been decreased in Step S15, is again increased in Step S12, making it impossible to change the duty cycle of the driving pulse SP. When it is considered that such a case may arise, as described above, after Step S15, control may be conducted that simply causes the rotation detection operation to wait until the next driving after the driving has ended, or when the rank has been increased in Step S15, limits decrease in the rank in Step S12.

Fourth Embodiment

Figure 20:
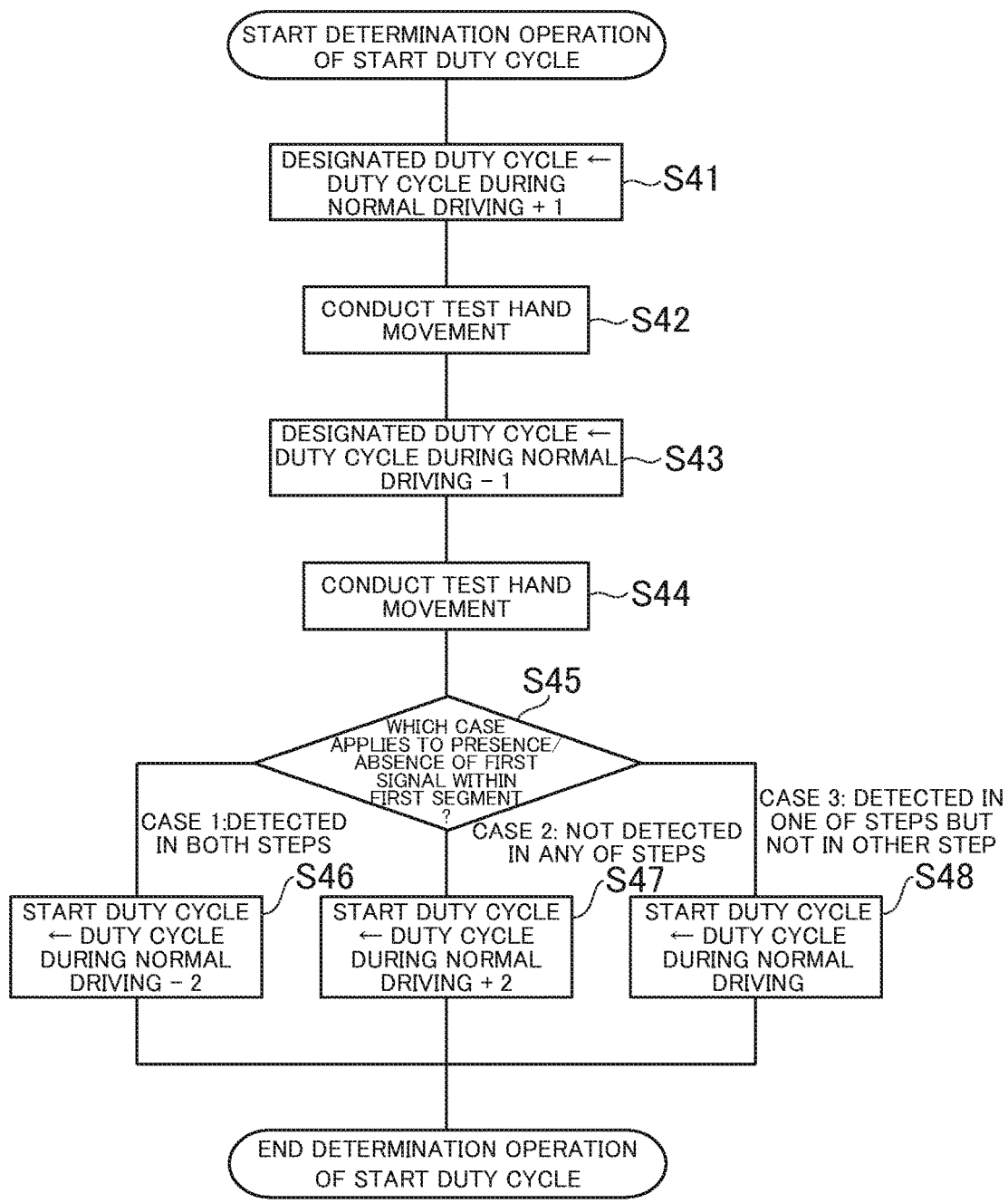
FIG. 20 is a flowchart for illustrating a start duty cycle determination operation of an electronic watch according to a fourth embodiment of the present invention.
Figure 21:
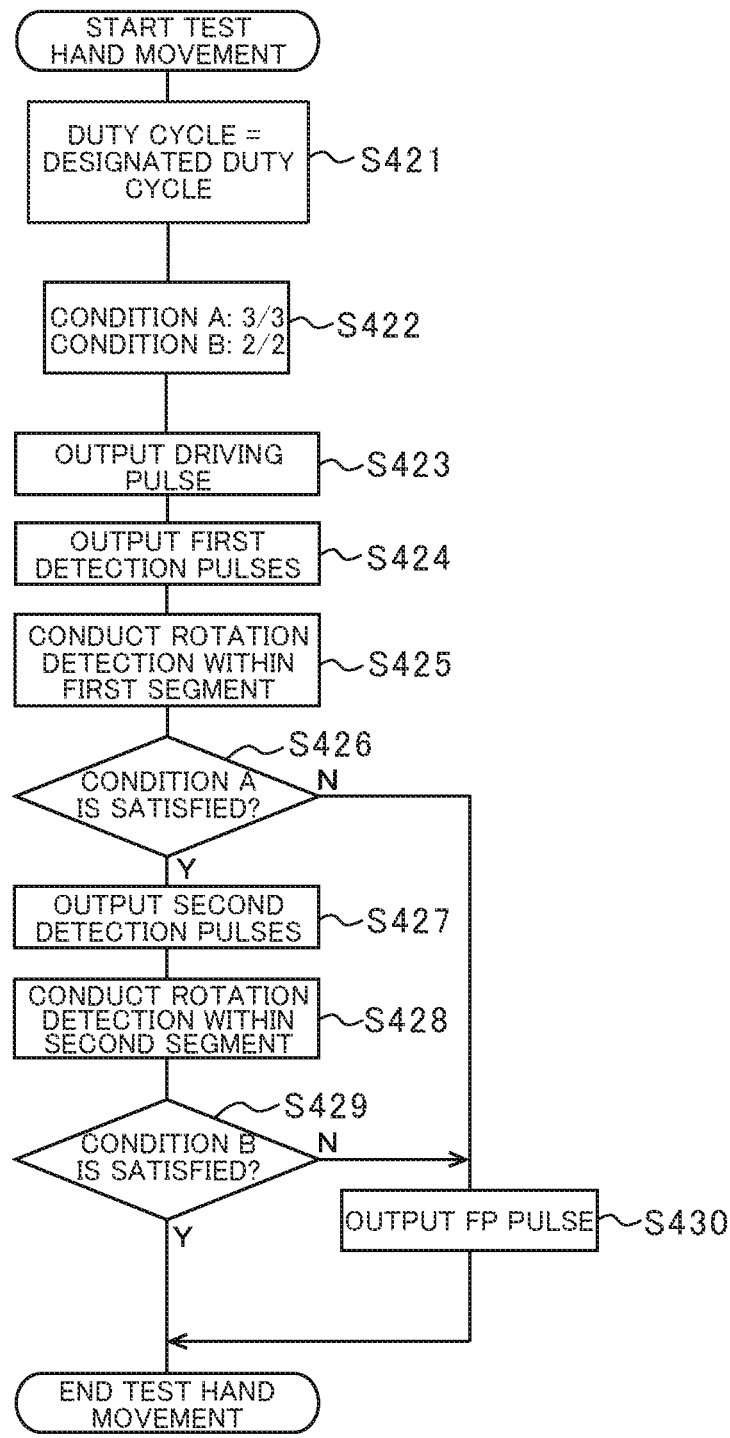
FIG. 21 is a flowchart for illustrating a test hand movement operation of the electronic watch according to the fourth embodiment of the present invention.

<Description of Operation of Electronic Watch According to Fourth Embodiment: FIG. 20 and FIG. 21>

Finally, operation of an electronic watch according to a fourth embodiment of the present invention is described with reference to the flowcharts of FIG. 20 and FIG. 21. The basic configuration of the fourth embodiment is the same as that in the first embodiment, and hence the configuration is as described with reference to FIG. 1.

In the first embodiment, as a method of determining the start duty cycle of the driving pulse SP when the electronic watch 1 proceeds from the normal driving to the high-speed driving, there is described a method in which there is set a higher duty cycle than the duty cycle of the driving pulse SP during the normal driving by referring to the duty table shown in FIG. 8. In contrast, in the fourth embodiment, as the method of determining the start duty cycle, hand movements having different duty cycles are conducted a plurality of times, and the start duty cycle is determined based on the results of those rotation detections.

In the flowchart of FIG. 20, there is illustrated a start duty cycle determination operation to be executed when the electronic watch 1 proceeds from the normal driving to the high-speed driving. In the determination operation of the start duty cycle, first, in Step S41, as a designated duty cycle, the duty cycle that is one rank higher than the duty cycle of the driving pulse SP during the normal driving is designated. For example, when the duty cycle of the driving pulse SP during the normal driving is 18/32, the designated duty cycle is 19/32, which is one rank higher. The designated duty cycle is the duty cycle of the driving pulse SP that is used during the hand movement (test hand movement) executed in the following Step S42.

Next, in Step S42, a test hand movement using the driving pulse SP having the designated duty cycle is conducted. The test hand movement is conducted in order to detect rotation by conducting a high-speed hand movement. The test hand movement may be conducted by employing the same hand movements as in any one of the above-mentioned first to third embodiments and modified examples thereof. However, during the test hand movement, a change in the rank of the duty cycle that results from rotation detection is not conducted.

In the flowchart of FIG. 21, there is illustrated operation of the test hand movement as conducted according to the first embodiment. First, in Step 3421, as the duty cycle (rank) of the driving pulse SP during the hand movement, the designated duty cycle is set. When the duty cycle that is one rank higher than the duty cycle of the rank during a normal hand movement is designated as being the designated duty cycle, the rank of the duty cycle of the driving pulse SP during the test hand movement is set to be one rank higher than the rank during the normal hand movement. Next, in Step S422, the condition A, which is the rotation detection condition within the first detection period G1, and the condition B, which is the rotation detection condition during the second detection period G2, are set. Those conditions are the same as the conditions used during the high-speed driving in the first embodiment, and are set in the same manner as in Step S3 of FIG. 5. When the same hand movement as that in the second embodiment is conducted as the operation during the test hand movement, in Step S422, similarly to Step S24 of FIG. 11, the apparent detection voltage Vth may be switched by selecting the second detection resistor unit 52. The same also applies for the third embodiment.

The operations of the subsequent Steps S423 to 3430 are the same as those of Steps S4 to S11 illustrated in the flowchart of FIG. 5 according to the first embodiment, and hence a duplicate description thereof is omitted here. Therefore, when rotation detection based on the conditions A and B is conducted, and it is not judged that the rotor 31 is rotating normally, in Step S430, the correction pulse FP is output. When the same hand movement as that in the second embodiment is conducted as the operation of the test hand movement, the same operations as those of Steps S25 to S32 (Steps S27 to S30 may be excluded) of FIG. 11 may be used in place of the operations of Steps S423 to S430. The same also applies for the third embodiment.

In this case, in the test hand movement, the increase in the rank of the duty cycle of the driving pulse SP that is seen in Step S12 in the flowchart of FIG. 5 is not conducted. This is because the test hand movement is a hand movement conducted based on the designated duty cycle, and it is not per se a hand movement that causes a change in the rank. The detection results of the detection pulses DS1 within the first detection period G1 in Step S426 are stored, and subsequently referred to.

Returning to FIG. 20, in Step S43, as the present designated duty cycle, the duty cycle having a rank one rank lower than the duty cycle of the driving pulse SP during the normal driving is designated. For example, when the duty cycle of the driving pulse SP during the normal driving is 18/32, the designated duty cycle is 18/32, which is one rank lower.

In Step S44, the test hand movement is similarly conducted based on the designated duty cycle. In this case, the test hand movement is conducted based on the duty cycle having the rank one rank lower than the duty cycle during the normal driving.

As a result of the operations of Steps S41 to S44, first, hand movements are conducted a plurality of times based on a driving pulse SP having a plurality of different duty cycles, and rotation detection is conducted for each hand movement.

Next, in Step S45, the presence/absence of the first signal of the detection signals DS1 within the first detection segment G1 in the test hand movements conducted a plurality of times (Steps S42 and S44) is judged. In this embodiment, in Step S45, three possible cases are discriminated, namely, a case where the first signal of the detection signals DS1 is detected within the first detection segment G1 in both Steps S42 and S44 (Case 1), a case where the first signal of the detection signals DS1 is not detected within the first detection segment G1 in any of Step S42 and Step S44 (Case 2), and a case where the first signal of the detection signals DS1 is detected within the first detection segment G1 in any one of Steps S42 and S44, but not in the other of Steps S42 and S44 (Case 3).

When the relevant case is judged to be Case 1 in Step S45 (i.e., that the first signal of the detection signals DS1 is detected within the first detection segment G1 in both Steps S42 and S44), in Step S46, as the start duty cycle, the duty cycle two ranks lower than the duty cycle during the normal driving is set. This means that the duty cycles of the ranks above and below the rank of the duty cycle of the driving pulse SP during the normal driving have a driving force strong enough to cause the rotor 31 to rotate at high speed during the high-speed driving, and hence a much lower rank is selected as the rank of the duty cycle during the stable high-speed driving. After the start duty cycle has been determined, the high-speed driving may be continued based on any of the above-mentioned first to third embodiments and modified examples thereof.

When the relevant case is judged to be Case 2 in Step S45 (i.e., that the first signal of the detection signals DS1 is not detected within the first detection segment G1 in any of Step S42 and S44), in Step S47, as the start duty cycle, the duty cycle two ranks higher than the duty cycle during the normal driving is set. This means that the duty cycles of the ranks above and below the rank of the duty cycle of the driving pulse SP during the normal driving do not have a driving force strong enough to cause the rotor 31 to rotate at high speed during the high-speed driving, namely, have an insufficient driving force, and hence a much higher rank is selected as the rank of the duty cycle during the stable high-speed driving. After the start duty cycle has been determined, the high-speed driving may be similarly continued based on any of the above-mentioned first to third embodiments and modified examples thereof.

When the relevant case is judged to be Case 3 in Step S45 (i.e., that the first signal of the detection signals DS1 is detected within the first detection segment G1 in any one of Steps S42 and S44, but not in the other of Steps S42 and S44), in Step S48, as the start duty cycle, the duty cycle that is the same as the duty cycle during the normal driving is set. This means that the duty cycles capable of stably driving the rotor 31 at high speed during the high-speed driving are in the vicinity of the rank of the duty cycle of the driving pulse SP during the normal driving, and hence the rank used during the normal driving is selected as the rank of the duty cycle during the stable high-speed driving. After the start duty cycle has been determined, the high-speed driving may be similarly continued based on any of the above-mentioned first to third embodiments and modified examples thereof.

As a result of the operations of Steps S45 to S48, the start duty cycle is determined based on the results of rotation detections for a plurality of hand movements conducted based on a driving pulse SP having a plurality of different duty cycles. Therefore, even when due to some circumstance the rank of the duty cycle of the driving pulse SP during the normal driving is a comparatively low duty cycle that is not necessarily suited to stable driving, a duty cycle having a rank that is closer to a duty cycle capable of stable high-speed driving may be selected as the start duty cycle, and hence it may be considered that the high-speed driving is rapidly stabilized.

The number of test hand movements (in this embodiment, two), and the designated duty cycle during each test hand movement, are not limited to the examples illustrated in this embodiment. An even larger number of test hand movements may be conducted, and a different duty cycle may be employed as the designated duty cycle. In the determination of the start duty cycle, consideration may be given to detection signals other than the first signal of the detection signals DS1 within the first detection segment G1, and a finer start duty cycle may be determined in accordance with the detection results. For example, in this embodiment, the start duty cycle is selected from among three possible cases, namely, Cases 1 to 3, but the start duty cycle may also be judged by dividing into even more possible cases, and selecting the optimum start duty cycle in accordance with each of those cases.

The block diagrams, the flowcharts, the timing charts, and the like used for illustrating the respective embodiments of the present invention are not intended to limit the present invention, and can be changed arbitrarily as long as the gist of the present invention is satisfied. For example, no limitations are imposed on the number of outputs of the detection pulses, the detection period, the number of times of detection, and the like within each of the detection segments, and those conditions may be changed arbitrarily in accordance with the performance of the step motor and the specifications of the electronic watch.

The invention claimed is:
1. An electronic watch, comprising:
a step motor;
a driving pulse generator circuit configured to output a driving pulse having a plurality of different driving forces for driving the step motor;
a detection pulse generator circuit configured to output, after the step motor has been driven by the driving pulse, a detection pulse for detecting rotation/non-rotation of the step motor;
a correction pulse generator circuit configured to output a correction pulse for compensation of driving by the driving pulse;
a pulse selection circuit configured to select and output the driving pulse, the detection pulse, and the correction pulse;
a driver circuit configured to supply to the step motor the driving pulse, the detection pulse, and the correction pulse output from the pulse selection circuit; and
a rotation detection circuit configured to receive a detection signal generated by the detection pulse to judge rotation/non-rotation of the step motor,
the pulse selection circuit being configured to, when a judgment of non-rotation is reached by the rotation detection circuit, output the correction pulse and select a driving pulse having a higher driving force than a present driving pulse, the electronic watch further comprising a driving interval switch circuit configured to switch a driving interval of the driving pulse between a normal driving interval which is a driving interval to be normally used, and a high-speed driving interval, which is a shorter driving interval than the normal driving interval, the rotation detection circuit being capable of changing a detection condition in accordance with the driving interval of the driving pulse, wherein the driving interval switch circuit is configured to change the detection condition of the rotation detection circuit between the normal driving interval and the high-speed driving interval, wherein the driving interval switch circuit is configured to change the detection condition of the rotation detection circuit such that non-rotation is judged more quickly when the high-speed driving interval is selected than when the normal driving interval is selected, wherein the driving interval switch circuit is configured to set a number of outputs of the detection pulse to be lower when the high-speed driving interval is selected than when the normal driving interval is selected.

2. The electronic watch according to claim 1,
wherein the rotation detection circuit is configured to detect a detection signal generated in response to output from the driver circuit to which the step motor is connected,
wherein the rotation detection circuit comprises a detection resistor connected to an output of the driver circuit, and
wherein the driving interval switch circuit is configured to set a resistance value of the detection resistor to be lower when the high-speed driving interval is selected than when the normal driving interval is selected.

3. The electronic watch according to claim 1,
wherein the rotation detection circuit is configured to detect a detection signal generated in response to output from the driver circuit to which the step motor is connected,
wherein the rotation detection circuit comprises a detection resistor connected to an output of the driver circuit, and
wherein the driving interval switch circuit is configured to set a resistance value of the detection resistor to be lower when the high-speed driving interval is selected than when the normal driving interval is selected.

4. The electronic watch according to claim 1,
wherein the rotation detection circuit is configured to detect a detection signal generated in response to output from the driver circuit to which the step motor is connected,
wherein the rotation detection circuit comprises a detection resistor connected to an output of the driver circuit, and
wherein the driving interval switch circuit is configured to set a resistance value of the detection resistor to be lower when the high-speed driving interval is selected than when the normal driving interval is selected.

5. The electronic watch according to claim 1, wherein the driving interval switch circuit is configured to set an absolute value of a threshold for judging whether or not the detection signal is detectable to be higher when the high-speed driving interval is selected than when the normal driving interval is selected.

6. The electronic watch according to claim 1, wherein the driving interval switch circuit is configured to set an absolute value of a threshold for judging whether or not the detection signal is detectable to be higher when the high-speed driving interval is selected than when the normal driving interval is selected.

7. The electronic watch according to claim 1, wherein the driving interval switch circuit is configured to set an absolute value of a threshold for judging whether or not the detection signal is detectable to be higher when the high-speed driving interval is selected than when the normal driving interval is selected.

8. The electronic watch according to claim 1, wherein the driving interval switch circuit is configured to set an absolute value of a threshold for judging whether or not the detection signal is detectable to be higher when the high-speed driving interval is selected than when the normal driving interval is selected.

9. The electronic watch according to claim 1, wherein the driving interval switch circuit is configured to select, when the rotation detection circuit detects the detection signal within a predetermined period from a start of output of the detection pulse but does not detect a subsequent detection signal, even though the rotation detection circuit judges that the step motor is not rotating, a driving pulse having a lower driving force than the present driving pulse as the driving pulse when the high-speed driving interval is selected.

10. The electronic watch according to claim 9, wherein the correction pulse generator circuit is configured to avoid outputting the correction pulse when a lower driving force than the present driving force is selected by the driving interval switch circuit as the driving pulse.

11. The electronic watch according to claim 1, wherein the driving interval switch circuit is configured to select, when switching from the normal driving interval to the high-speed driving interval, a higher driving force than the present driving force as the driving pulse.

12. The electronic watch according to claim 11, further comprising a consecutive rotation counter configured to count when rotation is detected and to be reset when non-rotation is detected,
wherein the driving interval switch circuit is configured to determine the driving force to be used when switching from the normal driving interval to the high-speed driving interval based on a value of the consecutive rotation counter.

13. The electronic watch according to claim 1, wherein the electronic watch is configured to:
conduct, when the driving interval switch circuit switches from the normal driving interval to the high-speed driving interval, driving of the step motor a plurality of times based on the driving pulse having a plurality of different driving forces, and conduct rotation detection by the rotation detection circuit for each of the plurality of times of the driving; and
select the driving force of the driving pulse based on a rotation detection result for the plurality of times of the driving of the step motor conducted based on the driving pulse having a plurality of different driving forces.

14. The electronic watch according to claim 1, wherein the detection condition is a detection period.

15. An electronic watch, comprising:
a step motor;
a driving pulse generator circuit configured to output a driving pulse having a plurality of different driving forces for driving the step motor;

a detection pulse generator circuit configured to output, after the step motor has been driven by the driving pulse, a detection pulse for detecting rotation/non-rotation of the step motor;

a correction pulse generator circuit configured to output a correction pulse for compensation of driving by the driving pulse;

a pulse selection circuit configured to select and output the driving pulse, the detection pulse, and the correction pulse;

a driver circuit configured to supply to the step motor the driving pulse, the detection pulse, and the correction pulse output from the pulse selection circuit; and a rotation detection circuit configured to receive a detection signal generated by the detection pulse to judge rotation/non-rotation of the step motor, the pulse selection circuit being configured to, when a judgment of non-rotation is reached by the rotation detection circuit, output the correction pulse and select a driving pulse having a higher driving force than a present driving pulse, the electronic watch further comprising a driving interval switch circuit configured to switch a driving interval of the driving pulse between a normal driving interval, which is a driving interval to be normally used, and a high-speed driving interval, which is a shorter driving interval than the normal driving interval, the rotation detection circuit being capable of changing a detection condition in accordance with the driving interval of the driving pulse, wherein the rotation detection circuit is configured to detect a detection signal generated in response to output from the driver circuit to which the step motor is connected, wherein the rotation detection circuit comprises a detection resistor connected to an output of the driver circuit, and wherein the driving interval switch circuit is configured to set a resistance value of the detection resistor to be lower when the high-speed driving interval is selected than when the normal driving interval is selected.

16. The electronic watch according to claim 15, wherein the driving interval switch circuit is configured to set an absolute value of a threshold for judging whether or not the detection signal is detectable to be higher when the high-speed driving interval is selected than when the normal driving interval is selected.

17. An electronic watch, comprising:

a step motor;

a driving pulse generator circuit configured to output a driving pulse having a plurality of different driving forces for driving the step motor;

a detection pulse generator circuit configured to output, after the step motor has been driven by the driving pulse, a detection pulse for detecting rotation/non-rotation of the step motor;

a correction pulse generator circuit configured to output a correction pulse for compensation of driving by the driving pulse;

a pulse selection circuit configured to select and output the driving pulse, the detection pulse, and the correction pulse;

a driver circuit configured to supply to the step motor the driving pulse, the detection pulse, and the correction pulse output from the pulse selection circuit; and a rotation detection circuit configured to receive a detection signal generated by the detection pulse to judge rotation/non-rotation of the step motor, the pulse selection circuit being configured to, when a judgment of non-rotation is reached by the rotation detection circuit, output the correction pulse and select a driving pulse having a higher driving force than a present driving pulse, the electronic watch further comprising a driving interval switch circuit configured to switch a driving interval of the driving pulse between a normal driving interval, which is a driving interval to be normally used, and a high-speed driving interval, which is a shorter driving interval than the normal driving interval, the rotation detection circuit being capable of changing a detection condition in accordance with the driving interval of the driving pulse, wherein the driving interval switch circuit is configured to set a width of the detection pulse to be narrower when the high-speed driving interval is selected than when the normal driving interval is selected.

* * * * *